(12) United States Patent
Konishi et al.

(10) Patent No.: US 7,398,450 B2
(45) Date of Patent: Jul. 8, 2008

(54) PARALLEL PRECODER CIRCUIT

(75) Inventors: Yoshiaki Konishi, Tokyo (JP); Kazuo Kubo, Tokyo (JP); Yasuyuki Endoh, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 217 days.

(21) Appl. No.: 11/304,913

(22) Filed: Dec. 16, 2005

(65) Prior Publication Data

US 2007/0061660 A1   Mar. 15, 2007

(30) Foreign Application Priority Data

Aug. 31, 2005  (JP) ............................. 2005-252195

(51) Int. Cl.
*G11C 29/00*  (2006.01)
(52) U.S. Cl. .................... 714/772; 341/76; 341/143
(58) Field of Classification Search ............. 714/757, 714/772; 341/76
See application file for complete search history.

(56) References Cited

U.S. PATENT DOCUMENTS

| | | | | |
|---|---|---|---|---|
| 4,486,739 A | * | 12/1984 | Franaszek et al. | 341/59 |
| 4,618,955 A | * | 10/1986 | Sharpe et al. | 714/761 |
| 6,456,208 B1 | * | 9/2002 | Nazari et al. | 341/59 |
| 6,753,797 B2 | * | 6/2004 | Bliss et al. | 341/59 |
| 6,920,604 B2 | * | 7/2005 | Coakeley et al. | 714/802 |
| 2005/0012534 A1 | * | 1/2005 | Konczykowska et al. | 327/202 |
| 2005/0135816 A1 | * | 6/2005 | Han et al. | 398/188 |
| 2006/0002714 A1 | * | 1/2006 | Gill et al. | 398/147 |

FOREIGN PATENT DOCUMENTS

| | | |
|---|---|---|
| JP | 11-122205 | 4/1999 |
| JP | 3474794 | 9/2003 |

* cited by examiner

*Primary Examiner*—M. Mujtaba K Chaudry
(74) *Attorney, Agent, or Firm*—Oblon, Spivak, McClelland, Maier & Neustadt, P.C.

(57) ABSTRACT

A parallel precoder circuit executes an EXOR operation on an n-row parallel input, and outputs an n-row parallel output, where $2 \leq n$. Outputs of EXOR circuits each of which having a largest column number from among EXOR circuits disposed in first to (n−1)th rows become first-row to (n−1)th-row parallel outputs, respectively. A output of an nth-row delay circuit becomes an nth-row parallel output.

25 Claims, 16 Drawing Sheets

PARALLEL PRECODER CIRCUIT

BACKGROUND OF THE INVENTION

1. Field of the Invention

The present invention relates to a parallel precoder circuit that executes an exclusive OR (EXOR) operation on a parallel input, and outputs a parallel output.

2. Description of the Related Art

In recent years, an optical duobinary modulation system and a differential phase shift keying (DPSK) system are calling attention as techniques of increasing a relay distance and increasing a transmission speed, in an optical communication system.

The optical duobinary system narrows a spectrum of a signal by applying a duobinary signal, and can decrease degradation of the signal due to wavelength dispersion. Because a carrier frequency component of the signal decreases, degradation of the signal due to inductive Brillouin scattering can be also decreased.

The duobinary system is classified as partial response (1, 1) in communication engineering, and a transmission and reception system includes a precoder, an encoder, and a decoder. The precoder calculates an EXOR of an input signal and a one-bit delay feedback signal obtained by delaying an output signal of the precoder by one bit, and outputs the calculated result. The encoder adds the output signal of the precoder and the one-bit delay feedback signal obtained by delaying the output signal of the precoder by one bit, and outputs the calculated result. The decoder carries out modulo 2 calculations using the output of the encoder. The precoder circuit is also used as a differential coder that converts the information of "1" and "0" to be communicated into a phase difference between two symbols that are continuously transmitted, in a differential phase shift modulation system.

In the optical duobinary system, a low pass filter achieves the function of the encoder, and a photodetector achieves the function of the decoder in many cases. In other words, individual analog parts and optical elements achieve the functions of the encoder and the decoder in many cases. On the other hand, a logical circuit is usually used for the precoder.

A transmission speed F (hertz) in the optical communication is an ultra-high speed of 10 Gbps and 40 Gbps. Therefore, when a serial precoder circuit that processes a signal as one-bit serial data according to this transmission speed is used, the EXOR circuit to be used is required to operate at an ultra-high speed.

When the transmission speed F becomes an ultra-high speed, a clock unit time per one bit becomes short. Therefore, timing adjustment of a circuit that achieves a one-bit delay becomes difficult.

To solve these problems, a conventional transmission and reception system using a duobinary system converts a serial input signal into a parallel input signal, and a parallel precoder circuit processes the parallel input signal. With this arrangement, the required ultra-high operation speed of the circuit that achieves the function of the precoder can be decreased.

Conventional techniques of a parallel precoder circuit are described in Japanese Patent Application Laid-open No. H11-122205 and Japanese Patent Publication No. 3474794. The conventional parallel precoder circuit described in Japanese Patent Application Laid-open No. H11-122205 operates as follows. To parallelize a signal into n ($2 \leq n$, where n is an integer) bit signals, the parallel precoder circuit first inputs the signal to the precoder to a separating circuit, serial-parallel converts the data, or directly uses a parallel signal from a pre-stage circuit such as a framer and develops the signal into an n-bit parallel signal sk(i) ($1 \leq i \leq n$, where i is an integer), and connects the sk(i) to one of inputs of n two-input EXOR circuits. Next, the parallel precoder circuit connects an output tk(i) of a kth ($1 \leq k \leq n-1$, where k is an integer) EXOR circuit to the other input of a (k+1)th EXOR circuit, thereby connecting the EXOR circuits in cascade. The parallel precoder circuit delays the output of the nth EXOR circuit by one clock at the operation speed F/n (hertz), and connects this output to the other input of the first EXOR circuit. Finally, a multiplexing circuit parallel-serial converts the outputs of the n EXOR circuits, and outputs the converted data. The parallel precoder circuit that develops the data in parallel operates equivalently to a serial precoder circuit that includes a set of two-input EXOR circuits and a one-clock delay circuit.

According to the conventional parallel precoder circuit described in Japanese Patent Publication No. 3474794, EXOR circuits are connected in cascade like the parallel precoder circuit described in Japanese Patent Application Laid-open No. H11-122205. The parallel precoder circuit inputs branched parallel input signals to multiple-input EXOR circuits, and inputs the outputs of these circuits to a differential encoding circuit The differential encoding circuit has EXOR circuits and a one-clock delay unit. Outputs of the EXOR circuits are input to the one-clock delay unit, and an output of the one-clock delay circuit is input to one EXOR circuit by feedback. An output of the differential encoding circuit is branched, and is also connected to one input of the first EXOR. A time-division multiplexing unit multiplexes the output of the EXOR circuits connected in cascade and the output of the differential encoding circuit, and outputs the multiplexed result. The parallel precoder circuit in this configuration also achieves the equivalent operation of the serial precoder circuit.

However, according to the conventional parallel precoder circuit described in Japanese Patent Application Laid-open No. H11-122205, the path in which a signal is once input to the one-clock delay circuit and passed through all the n EXOR circuits and is input again to the one-clock delay circuit by feedback becomes a maximum delay path that determines an upper limit operation speed of the circuit. In other words, the signal needs to be propagated to the EXOR circuits directly connected at n stages within the one-clock unit time n/F (second) at the operation speed F/n. Therefore, although the input signal is developed into n bits in parallel, a delay time permitted to one EXOR circuit is 1/n. Therefore, individual EXOR circuits must operate at F (hertz), and the effect of the parallelization cannot be obtained sufficiently.

In general, to decrease the number of combined circuits within the maximum delay path (in this case, EXOR circuits), a pipeline method of inserting a flip-flop circuit into between the combined circuits can be used. However, according to the parallel precoder circuit described in Japanese Patent Application Laid-open No. H11-122205, the maximum delay path is a feedback loop in which a signal is once input to the one-clock delay circuit and passed through all the n EXOR circuits and is input again to the one-clock delay circuit by feedback. Therefore, the pipeline method cannot be used in this case.

According to the conventional parallel precoder circuit described in Japanese Patent Publication No. 3474794, the operation speed of the EXOR circuits is relaxed to F/n (hertz), by decreasing the number of stages of the EXOR circuits included in the feedback part to one stage. However, EXOR circuits proportional to the n EXOR circuits connected in cascade remain in order to generate the output of the parallel precoder circuit. When the pipeline system is applied to match the timing of the parallel output signals from the EXOR circuits connected in cascade, flip-flops of the square of n become necessary, which results in a too large circuit scale.

Separately from the conventional parallel precoder circuits described in Japanese Patent Application Laid-open No. H11-122205 and Japanese Patent Publication No. 3474794, there is also a circuit configuration that generates output signals of the parallel precoder circuit from input signals developed in parallel, without using the outputs of EXOR circuits at lower digits within the parallel signals. According to this circuit configuration, the number of stages of the EXOR circuits in the maximum delay path can be decreased. However, according to this circuit configuration, the number of gates of the EXOR circuits, the number of FAN OUTs that branch signal lines, and a wiring length become large. Consequently, the circuit size becomes large in proportion to the square of n.

SUMMARY OF THE INVENTION

It is an object of the present invention to at least solve the problems in the conventional technology.

A parallel precoder circuit according to one aspect of the present invention executes an EXOR operation on an n-row parallel input, and outputs an n-row parallel output, where n is an integer equal to or larger than two. The parallel precoder circuit includes an nth-row delay circuit that delays an output of an EXOR circuit having a largest column number from among EXOR circuits disposed in nth row; a zeroth-column EXOR circuit that executes the EXOR operation of an output of the nth-row delay circuit and a first-row parallel input; a (2k)th-row first-column EXOR circuit that executes the EXOR operation of a (2k)th-row parallel input and an output of the zeroth-column EXOR circuit when k is one or a (2k−1)th-row parallel signal when k is larger than one, where k is an integer equal to or larger than one and equal to or smaller than n/2; a (2k)th-row mth-column EXOR circuit that executes the EXOR operation of an output of a (2k)th-row (m−1)th-column EXOR circuit, when $2k-2^{(m-1)}$ is equal to or larger than one, and an output of a $(2k-2^{(m-1)})$th-row (m−1)th-column EXOR circuit when an EXOR circuit is disposed in $(2k-2^{(m-1)})$th-row (m−1)th-column or an output of an EXOR circuit having a largest column number from among EXOR circuits disposed in $(2k-2^{(m-1)})$th row when no EXOR circuit is disposed in $(2k-2^{(m-1)})$th-row (m−1)th-column, where m is an integer equal to or larger than two and equal to or smaller than h−1, and h is a smallest integer equal to or larger than $\log_2 n+1$; and a (2k−1)th-row hth-column EXOR circuit that executes the EXOR operation of a (2k−1)th-row parallel signal and an output of an EXOR circuit having a largest column number from among EXOR circuits disposed in (2k−2)th row. Outputs of EXOR circuits each of which having a largest column number from among EXOR circuits disposed in first to (n−1)th rows become first-row to (n−1)th-row parallel outputs, respectively. The output of the nth-row delay circuit becomes an nth-row parallel output.

A parallel precoder circuit according to another aspect of the present invention executes an EXOR operation on an n-row parallel input, and outputs an n-row parallel output, where n is an integer equal to or larger than two. The parallel precoder circuit includes an nth-row delay circuit that delays an output of an EXOR circuit having a largest column number from among EXOR circuits disposed in nth row; a zeroth-column EXOR circuit that executes the EXOR operation of an output of the nth-row delay circuit and a first-row parallel input; an (r×k)th-row first-column EXOR circuit that executes the EXOR operation of an output of the zeroth-column EXOR circuit and parallel inputs from second row to rth row when k is 1, and executes the EXOR operation of parallel input from (r×k−r+1)th row to (r×k)th row when k is larger than 1, where r is a maximum number of inputs to a plurality of multiple-input EXOR circuits, r is an integer equal to or larger than two, and k is an integer equal to or larger than one and equal to or smaller than n/r; an (r×k)th-row mth-column multiple-input EXOR circuit that executes the EXOR operation with an output of an $(r×k-p×r^{(m-1)})$th-row (m−1)th-column multiple-input EXOR circuit from $(r×k-(r-1)×r^{(m-1)})$th row to (r×k)th row as an input when $r×k-p×r^{(m-1)}$ is equal to or larger than one, and executes the EXOR operation with an output of a multiple-input EXOR circuit having a largest column number from among multiple-input EXOR circuits disposed in $(r×k-p×r^{(m-1)})$th row as the input when no multiple-input EXOR circuit is disposed in $(r×k-p×r^{(m-1)})$th row (m−1)th column, where m is an integer equal to or larger than 2 and equal to or smaller than h−1, h is a smallest integer equal to or larger than $\log_r n+1$, and p is an integer equal to or larger than zero and equal to or smaller than r−1; and an (r×k−q)th-row hth-column multiple-input EXOR circuit that executes the EXOR operation of a parallel input from (r×k−1)th row to (r×k−q)th row and an output of a multiple-input EXOR circuit having a largest column number from among multiple-input EXOR circuits disposed in (r×k−r)th row, where q is an integer equal to or larger than one and equal to or smaller than r−1. Outputs of EXOR circuits each of which having a largest column number from among EXOR circuits disposed in first to (n−1)th rows become first-row to (n−1)th-row parallel outputs, respectively. The output of the nth-row delay circuit becomes an nth-row parallel output.

A parallel precoder circuit according to still another aspect of the present invention executes an EXOR operation on an n-row parallel input, and outputs an n-row parallel output, where n is an integer equal to or larger than two. The parallel precoder circuit includes an nth-row delay circuit that delays an output of an EXOR circuit having a largest column number from among EXOR circuits disposed in nth row; a zeroth-column EXOR circuit that executes the EXOR operation of an output of the nth-row delay circuit and a first-row parallel input; a kth-row first-column EXOR circuit that executes the EXOR operation of a kth-row parallel input and an output of the zeroth-column EXOR circuit when k is two or a (k−1)th-row parallel input when k is larger than two, where k is an integer equal to or larger than two and equal to or smaller than n; and a kth-row mth-column EXOR circuit that executes the EXOR operation of an output of a kth-row (m−1)th-column EXOR circuit and an output of a $(k-2^{(m-1)})$th-row (m−1)th-column, when $k-2^{(m-1)}$ is equal to or larger than one, and executes the EXOR operation of the output of the kth-row (m−1)th-column EXOR circuit and an output of an EXOR circuit having a largest column number from among EXOR circuits disposed in $(k-2^{(m-1)})$th row when no EXOR circuit is disposed in $(k-2^{(m-1)})$th-row (m−1)th-column, where m is an integer equal to or larger than two and equal to or smaller than h, and h is a smallest integer equal to or larger than $\log_2 n$. Outputs of EXOR circuits each of which having a largest column number from among EXOR circuits disposed in first to (n−1)th rows become first-row to (n−1)th-row parallel outputs, respectively. The output of the nth-row delay circuit becomes an nth-row parallel output.

A parallel precoder circuit according to still another aspect of the present invention executes an EXOR operation on an n-row parallel input, and outputs an n-row parallel output, where n is an integer equal to or larger than two. The parallel precoder circuit includes an nth-row delay circuit that delays an output of an EXOR circuit having a largest column number from among EXOR circuits disposed in nth row; a zeroth-column EXOR circuit that executes the EXOR operation of an output of the nth-row delay circuit and a first-row parallel input; a kth-row first-column EXOR circuit that executes the EXOR operation of an output of the zeroth-column EXOR circuit and a (k–q)th-row parallel input from second row to kth row when k–q is one, or a (k–q)th-row parallel input from (k–r+1)th row to the kth row when k–q is larger than one, where r is a maximum number of inputs to a plurality of multiple-input EXOR circuits, r is an integer equal to or larger than two, k is an integer equal to or larger than two and equal to or smaller than n, and q is an integer equal to or larger than zero and equal to or smaller than r–1; and a kth-row mth-column multiple-input EXOR circuit that executes the EXOR operation with an output of a (k–p×r^(m–1))th-row (m–1)th-column multiple-input EXOR circuit from (k–(r–1)×r^(m–1))th row to the kth row as an input when k–p×r^(m–1) is equal to or larger than one, and executes the EXOR operation with an output of a multiple-input EXOR circuit having a largest column number from among multiple-input EXOR circuits disposed in (k–p×r^(m–1))th row when no multiple-input EXOR circuit is disposed in (k–p×r^(m–1))th-row (m–1)th-column, where m is an integer equal to or larger than two and equal to or smaller than h, h is a smallest integer equal to or larger than $\log_2 n$, and p is an integer equal to or larger than zero and equal to or smaller than r–1. Outputs of EXOR circuits each of which having a largest column number from among EXOR circuits disposed in first to (n–1)th rows become first-row to (n–1)th-row parallel outputs, respectively. The output of the nth-row delay circuit becomes an nth-row parallel output.

A parallel precoder circuit according to still another aspect of the present invention executes an EXOR operation on an n-row parallel input, and outputs an n-row parallel output; where n is an integer equal to or larger than two. The parallel precoder circuit includes an nth-row delay circuit that delays an output of an EXOR circuit having a largest column number from among EXOR circuits disposed in nth row; a zeroth-column EXOR circuit that executes the EXOR operation of an output of the nth-row delay circuit and a first-row parallel input; a (2k)th-row first-column EXOR circuit that executes the EXOR operation of a (2k)th-row parallel input and an output of the zeroth-column EXOR circuit when k is one or a (2k–1)th-row parallel input when k is larger than one, where k is an integer equal to or larger than one and equal to or smaller than n/2; a ((2^m)×k)th-row mth-column EXOR circuit that executes the EXOR operation of an output of a ((2^m)×k)th-row (m–1)th-column EXOR circuit and an output of a ((2^m)×k–2^(m–1))th-row (m–1)th-column EXOR circuit when (2^m)×k–2^(m–1) is equal to or larger than one and when (2^m)×k is equal to or smaller than n, where m is an integer equal to or larger than two and equal to or smaller than hh, and hh is a smallest integer equal to or larger than $\log_2 n$ satisfying h=2×hh–1, where h indicates a last column where an EXOR circuit is disposed; and a ((2^hh–(2kk–1)×2^(2hh–m–1))th-row mth-column EXOR circuit that executes the EXOR operation of an output of an EXOR circuit having a largest column number from among EXOR circuits disposed in ((2^hh–(2kk–1)×2^(2hh–m–1))th row and an output of an EXOR circuit having a largest column number from among EXOR circuits disposed in ((2^hh–2kk×2^(2hh–m–1))th row when m is equal to or larger than hh and equal to or smaller than 2×hh–1, where kk is an integer equal to or larger than one. Outputs of EXOR circuits each of which having a largest column number from among EXOR circuits disposed in first to (n–1)th rows become first-row to (n–1)th-row parallel outputs, respectively. The output of the nth-row delay circuit becomes an nth-row parallel output.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings. It should be noted that the present invention is not limited by the exemplary embodiments.

A parallel precoder circuit according to a first embodiment of the present invention is explained below with reference to FIGS. 1 to 8. The parallel precoder circuit according to the first embodiment calculates parallel outputs $O_1$ to $O_n$ from parallel inputs $I_1$ to $I_n$ of n ($2 \leq n$, where n is an integer) bits.

The parallel precoder circuit according to the first embodiment includes two-input EXOR circuits $1a$ ($1a$-(i, j)), and delay circuits $1b$ ($1b$-1 to $1b$-n) that are constituted by flip-flops and output input signals by delaying the signals by a unit time. The unit time is an inverse number of the operation speed of the parallel precoder circuit. When a transmission speed is F (hertz), the unit time becomes "n/F" (second). The EXOR circuits $1a$ and the delay circuits $1b$ are connected in a net configuration described later.

Each of the EXOR circuits $1a$-(i, j) is disposed in an ith row and a jth column. The ith row EXOR circuit is an EXOR circuit disposed in a signal path that connects between a parallel input $I_i$ and a delay circuit $1b$-i. An EXOR circuit that is input with an output of the delay circuit $1b$-n and a parallel input $I_1$ is defined as a zeroth EXOR circuit. A jth EXOR circuit from the parallel input $I_i$ in an even row ($2 \leq i$, where i is an even number) is defined as the jth column EXOR circuit. An EXOR circuit that is disposed at a pre-stage of the delay circuit $1b$-i in an odd row other than one row is an EXOR circuit disposed in the last column. In the first embodiment, a last column h is a smallest integer equal to or above $\log_2 n + 1$. For example, when the number of bits n is "7", the last column becomes "4".

Figure 1:
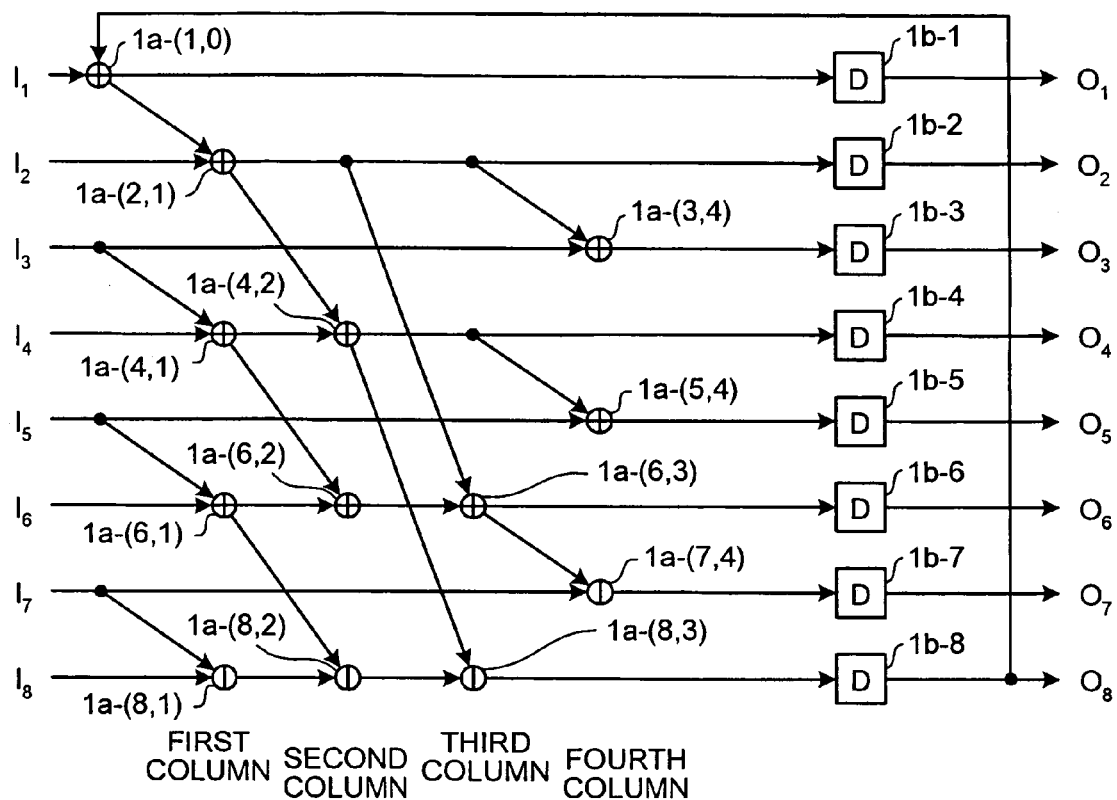
FIG. 1 is a schematic for illustrating an example of a configuration of a parallel precoder circuit according to a first embodiment of the present invention.

FIG. 1 is a schematic for illustrating an example of a configuration of a parallel precoder circuit according to the first embodiment when "the number of bits n=8". The parallel precoder circuit includes EXOR circuits $1a$ ($1a$-(1, 0), $1a$-(2, 1), $1a$-(4, 1), $1a$-(6, 1), $1a$-(8, 1), $1a$-(4, 2), $1a$-(6, 2), $1a$-(6, 3), $1a$-(8, 2), $1a$-(8, 3), $1a$-(3, 4), $1a$-(5, 4), and $1a$-(7, 4)), and delay circuits (Ds in FIG. 1) $1b$ ($1b$-1 to $1b$-8).

The EXOR circuit $1a$-(1, 0) is disposed in the first row and the zeroth column, the EXOR circuit $1a$-(2, 1) is disposed in the second row and the first column, the EXOR circuit $1a$-(4, 1) is disposed in the fourth row and the first column, the EXOR circuit $1a$-(6, 1) is disposed in the sixth row and the first column, the EXOR circuit $1a$-(8, 1) is disposed in the eighth row and the first column, the EXOR circuit $1a$-(4, 2) is disposed in the fourth row and the second column, the EXOR circuit $1a$-(6, 2) is disposed in the sixth row and the second column, the EXOR circuit $1a$-(6, 3) is disposed in the sixth row and the third column, the EXOR circuit $1a$-(8, 2) is disposed in the eighth row and the second column, the EXOR circuit $1a$-(8, 3) is disposed in the eighth row and the third column, the EXOR circuit $1a$-(3, 4) is disposed in the third row and the fourth column, the EXOR circuit $1a$-(5, 4) is disposed in the fifth row and the fourth column, and the EXOR circuit $1a$-(7, 4) is disposed in the seventh row and the fourth column. The fourth column is the last column.

A parallel input $I_{2k}$ is connected to one input and a parallel input $I_{2k-1}$ is connected to the other input respectively of an EXOR circuit in an even row and the first column, that is the EXOR circuit $1a$-(2k, 1) in the (2k)th ((2k)th row, $1 \leq k \leq n/2$, where k is an integer) row and the first column. However, instead of the parallel input $I_1$, the output of the EXOR circuit $1a$-(1, 0) in the first row and the zeroth column is connected to the other input of the EXOR circuit $1a$-(2, 1) in the second row and the first column.

The output of the EXOR circuit $1a$-(2k-2^(m-1), m-1) is connected to one input, and the output of the EXOR circuit $1a$-(2k, m-1) is connected to the other input respectively of the EXOR circuit $1a$-(2k, m) in the (2k)th row and the mth column ($1 \leq m \leq h-1$). However, when no EXOR circuit is disposed in the (2k-2^(m-1))th row and the (m-1)th column, the output of the EXOR circuit in the jth column having a largest column number j among EXOR circuits disposed in the (2k-2^(m-1))th row is connected to one input of the EXOR circuit $1a$-(2k, m). The operator "^" denotes power.

As shown in FIG. 1, the output of the EXOR circuit $1a$-(2, 1) is connected to one input, and the output of the EXOR circuit $1a$-(6, 2) is connected to the other input respectively of the EXOR circuit $1a$-(6, 3) of k=3 and m=3.

When 2k-2^(m-1) is smaller than 1, no EXOR circuit is disposed. In FIG. 1, no EXOR circuit is disposed at the position of k=2 and m=3, that is, in the fourth row and the third column.

The output of the parallel input $I_{2k-1}$ is connected to one input of the EXOR circuit $1a$-(2k-1, h) in the (2k-1)th row and the hth column disposed in the last column. The output of the EXOR circuit in the jth column having a largest column number j among EXOR circuits disposed in the (2k-2)th row is connected to the other input of the EXOR circuit $1a$-(2k-1, h). However, no EXOR circuit is disposed in the first row in the last column. In FIG. 1, the last column is "4". Therefore, the parallel input $I_5$ is connected to one input, and the output of the EXOR circuit $1a$-(4, 2) is connected to the other input respectively of the EXOR circuit $1a$-(5, 4).

The output of the EXOR circuit in the jth column having a largest column number j among EXOR circuits disposed in the (2k)th row is connected to the input of the delay circuit $1b$-2k in the (2k)th row (the even row). In FIG. 1, the output of the EXOR circuit $1a$-(4, 2) is connected to the input of the delay circuit $1b$-4.

The output of the EXOR circuit $1a$-(2k-1, h) disposed in the last column, that is, in the (2k-1)th row in the hth column, is connected to the input of the delay circuit $1b$-(2k-1) in the (2k-1)th row (the odd row). However, the output of the EXOR circuit $1a$-(1, 0) is connected to the input of the delay circuit $1b$-1 in the first row. The output of the delay circuit $1b$-i becomes a parallel output $O_i$.

Figure 2:
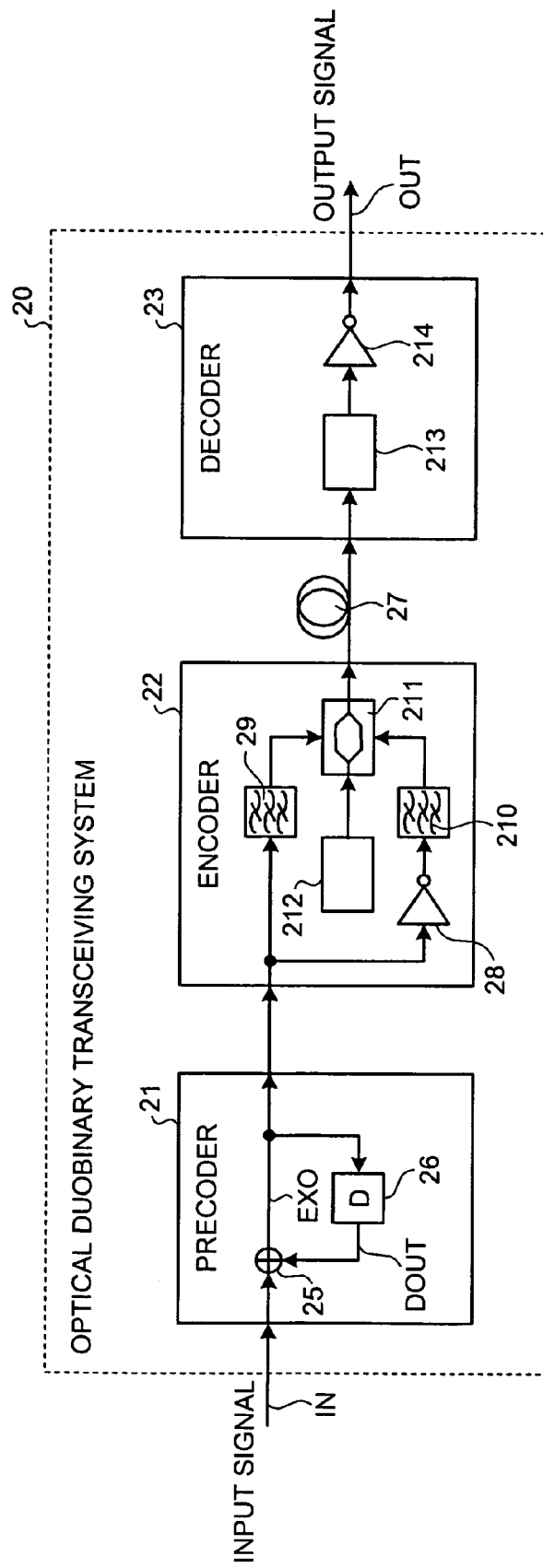
FIG. 2 is a schematic of a configuration of circuits of a general optical duobinary transceiving system.

FIG. 2 is a schematic of a configuration of circuits of a general optical duobinary transceiving system. An optical duobinary transceiving system 20 includes a precoder 21, an encoder 22, and a decoder 23.

The precoder 21 is a serial precoder circuit, and includes an EXOR circuit 25, and a delay circuit (D in FIG. 2) 26. An input signal IN is connected to one input, and an output DOUT of the delay circuit 26 is connected to the other input respectively of the EXOR circuit 25. An output EXO of the EXOR circuit 25 is connected to the delay circuit 26 and the encoder 22. In other words, the EXOR circuit 25 and the delay circuit 26 constitute a feedback loop.

The delay circuit 26 includes a flip-flop that operates synchronously with the clock, and a delay-adjusted delay line. The delay circuit 26 delays the output of the EXOR circuit 25 by one clock unit time. For example, when a transmission speed of a transmission path 27 is F (hertz), one clock unit time becomes 1/F (second).

The encoder 22 includes an inverter circuit 28 that inverts the output of the precoder 21, that is, the output EXO of the EXOR circuit 25, a low pass filter 210 that removes a high-frequency component of an output of the inverter circuit 28, a low pass filter 29 that removes a high-frequency component of the output of the precoder 21, and a Mach-Zehnder modulator 211 that modulates light emitted from an optical source 212 based on outputs of the low pass filters 29 and 210.

The decoder circuit 23 includes an optical receiver 213 that carries out a binary detection of an optical signal input from the transmission path 27 by recognizing "0" as no optical signal and "1" as an optical signal, and an inverter circuit 214 that inverts an output from the optical receiver 213. The decoder decodes the input signal IN, and produces a decoded output signal OUT. There are various other configurations of the encoder 22 and the decoder 23 than those shown in FIG. 2. However, the processing that the precoder 21 should execute does not depend on the configurations of the encoder 22 and the decoder 23.

Figure 3:
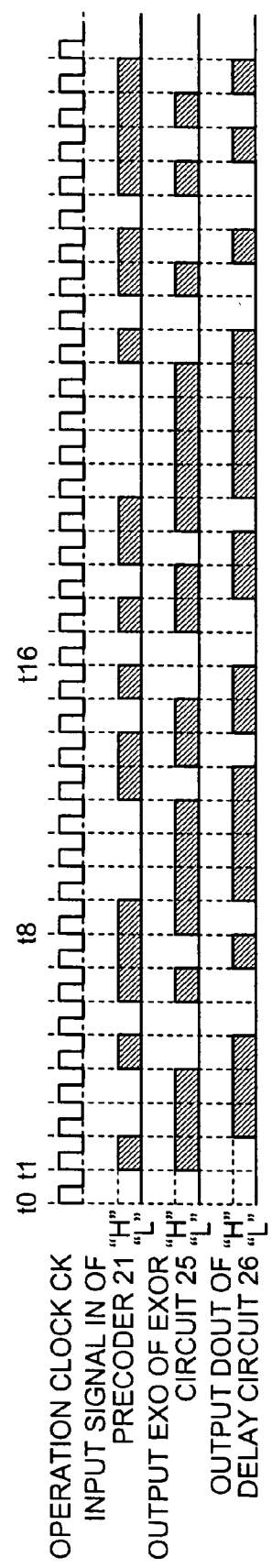
FIG. 3 is a timing chart for explaining an operation of a precoder shown in FIG. 2.

FIG. 3 is a timing chart for explaining an operation of the precoder 21 shown in FIG. 2. The precoder 21 operates in an operation clock CLK using one cycle as one unit time. At time T0, the output EXO of the EXOR circuit 25 and the output DOUT of the delay circuit 26 are "0" ("L" in FIG. 3). The two-input EXOR circuit 25 produces the output EXO as "0" when both inputs are "1" ("H" in FIG. 3) or "0", and produces the output EXO as "1" when one input is "1" and the other input is "0". For example, at time t1, both the input signal IN, and DOUT of the delay circuit 26 are "0". Therefore, the EXOR circuit 25 produces the output EXO as "0".

As shown in FIG. 3, starting from time t0, the input signals IN (one input to the EXOR circuit 25) are sequentially applied to the precoder 21 as "0100101110001101010110000101101111" in the one unit time cycle. Starting from time t1, the EXOR circuit 25 produces the output EXO as the output of the precoder 21, in the order of "1110010111101100110111111001001010".

The output of the precoder 21 becomes a value obtained by sequentially EXOR calculating and adding the input signal IN input to the precoder 21. The output EXO of the EXOR circuit 25 at time t is equal to a value obtained by inputting the output EXO of the EXOR circuit 25 or the output DOUT of the delay circuit 26 at a certain time, and all signals input to the precoder 21 from this time to time t, to multiple-input EXOR circuits, and adding all these inputs.

The output of n-input EXOR circuits becomes "1" when an odd number of "1" are input, and becomes "0" when an even number of "1" are input. For example, in FIG. 3, the output DUOT of the delay circuit 26 at time t0 is "0". The input signals IN of the precoder 21 from time t0 to t8 are "010010111", and number of "1" is an odd number. When the input signals IN are input to the multiple-input EXOR circuits from time t0 to time t8, the output becomes "1", and this becomes equal to the output signal EXO "1" of the EXOR circuit 25 at time t8 in FIG. 3.

The output DOUT of the delay circuit 26 at time t0 is "0". The input signals IN of the precoder from time t0 to time t16 become "0100101110001101 0", and number of "1" is an even number. When the input signals IN are input to the multiple-input EXOR circuits from time t0 to time t16, the output becomes "0", and this becomes equal to the output signal EXO "0" of the EXOR circuit 25 at time t16 in FIG. 3.

Figure 4:
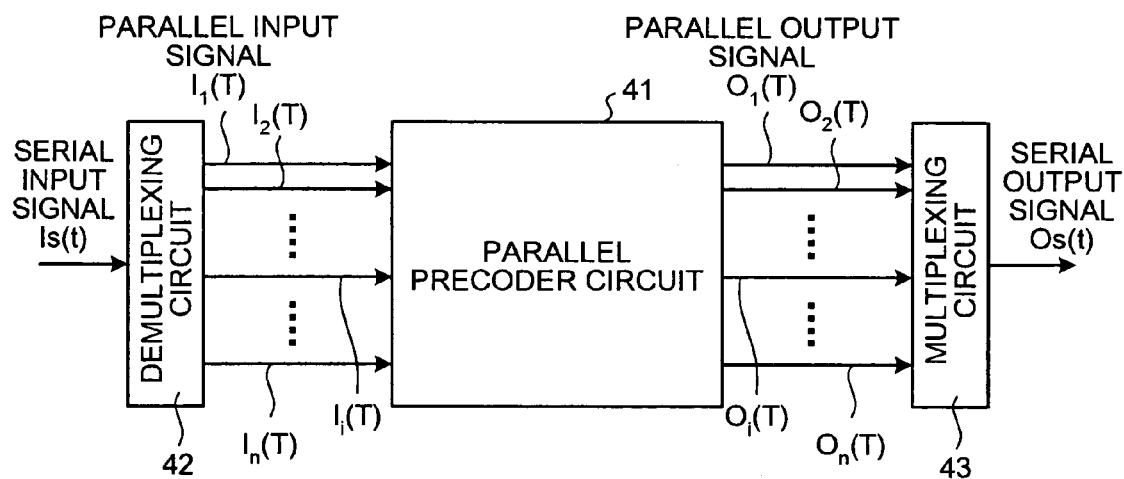
FIG. 4 is a block diagram of a configuration of a duobinary signal parallel precoder circuit to which the parallel precoder circuit according to the first embodiment is applied.

FIG. 4 is a block diagram of a configuration of a duobinary-signal parallel precoder circuit to which the parallel precoder circuit according to the first embodiment is applied. The duobinary-signal parallel precoder circuit shown in FIG. 4 operates equivalently to the serial precoder circuit. The duobinary-signal parallel precoder circuit includes a demultiplexing circuit 42 at a pre-stage of a parallel precoder circuit 41, and a multiplexing circuit 43 at a post-stage of the parallel precoder circuit 41. When an output of a processing circuit such as a framer not shown disposed at the pre-stage of the parallel precoder circuit 41 and an input of an encoder not shown disposed at the post-stage of the parallel precoder circuit 41 are not parallelized, the demultiplexing circuit 42 and the multiplexing circuit 43 do not need to be disposed.

The demultiplexing circuit 42 generates n-bit parallel output signals, that is, parallel input signals $I_1(T)$ to $I_n(T)$ to the parallel precoder circuit 41, by serial-parallel converting a serial input $I_s(t)$.

The parallel precoder circuit 41 calculates parallel, output signals $O_1(T)$ to $O_n(T)$ from the parallel input signals $I_1(T)$ to $I_n(T)$. The multiplexing circuit 43 outputs a serial output signal $O_s(t)$ by parallel-serial converting the parallel output signals $O_1(T)$ to $O_n(T)$ calculated by the parallel precoder circuit 41.

The parallel input signals $I_1(T)$ to $I_n(T)$ are the data transmitted in time series in the order of the parallel input signal $I_1(T)$, the parallel input signal $I_2(T)$, ..., and the parallel input signal $I_n(T)$, when the signals are serially transmitted. The parallel output signals $O_1(T)$ to $O_n(T)$ are the data transmitted in time series in the order of the parallel output signal $O_1(T)$, the parallel output signal $O_2(T)$, ..., and the parallel output signal $O_n(T)$, when the signals are serially transmitted.

The serial input signal $I_s(t)$ and the serial output signal $O_s(t)$ are input and output respectively, synchronously with a clock of the transmission speed F (hertz), that is, a clock of 1/F (second) cycle. In other words, the parallel precoder circuit 41 operates in an operation clock T=F/n (hertz).

When a signal is to be parallelized into n-bit signals, based on the above definition, the latest data in serially transmitted data is $O_n(T-1)$ among the parallel output signals $O_n(T)$ one clock before the operation clock T of the parallel precoder circuit 41. Based on the above characteristic of the precoder output, a certain parallel output signal $O_i(T)$ of the parallel precoder circuit 41 is obtained by EXOR calculating the parallel output signal $O_n(T-1)$ and the parallel input signal $I_1(T)$ to the parallel input signal $I_{i-1}(T)$.

When an EXOR operator is expressed as "*", the first parallel output signal $O_1$ of the parallel precoder circuit 41 that calculates the n-bit parallel output signals $O_1(T)$ to $O_n(T)$ can be expressed as $$O_1(T)=O_n(T-1)*I_1(T)$$

The second parallel output signal $O_2$ can be expressed as $$O_2(T)=O_n(T-1)*I_1(T)*I_2(T)$$

The (n−1)th parallel output signal $O_{n-1}$ can be expressed as $$O_{n-1}(T)=O_n(T-1)*I_1(T)*I_2(T)* \ldots *I_{n-1}(T)$$

The nth parallel output signal $O_n$ can be expressed as $$O_n(T)=O_n(T-1)*I_1(T)*I_2(T)* \ldots *I_{n-1}(T)*I_n(T)$$

In other words, the ith parallel output signal $O_i(T)$ of the parallel precoder circuit 41 that calculates the n-bit parallel output signals $O_1(T)$ to $O_n(T)$ can be expressed as $$O_i(T)=O_n(T-1)*I_1(T)*I_2(T)* \ldots *I_i(T) \qquad (1)$$

Figure 5:
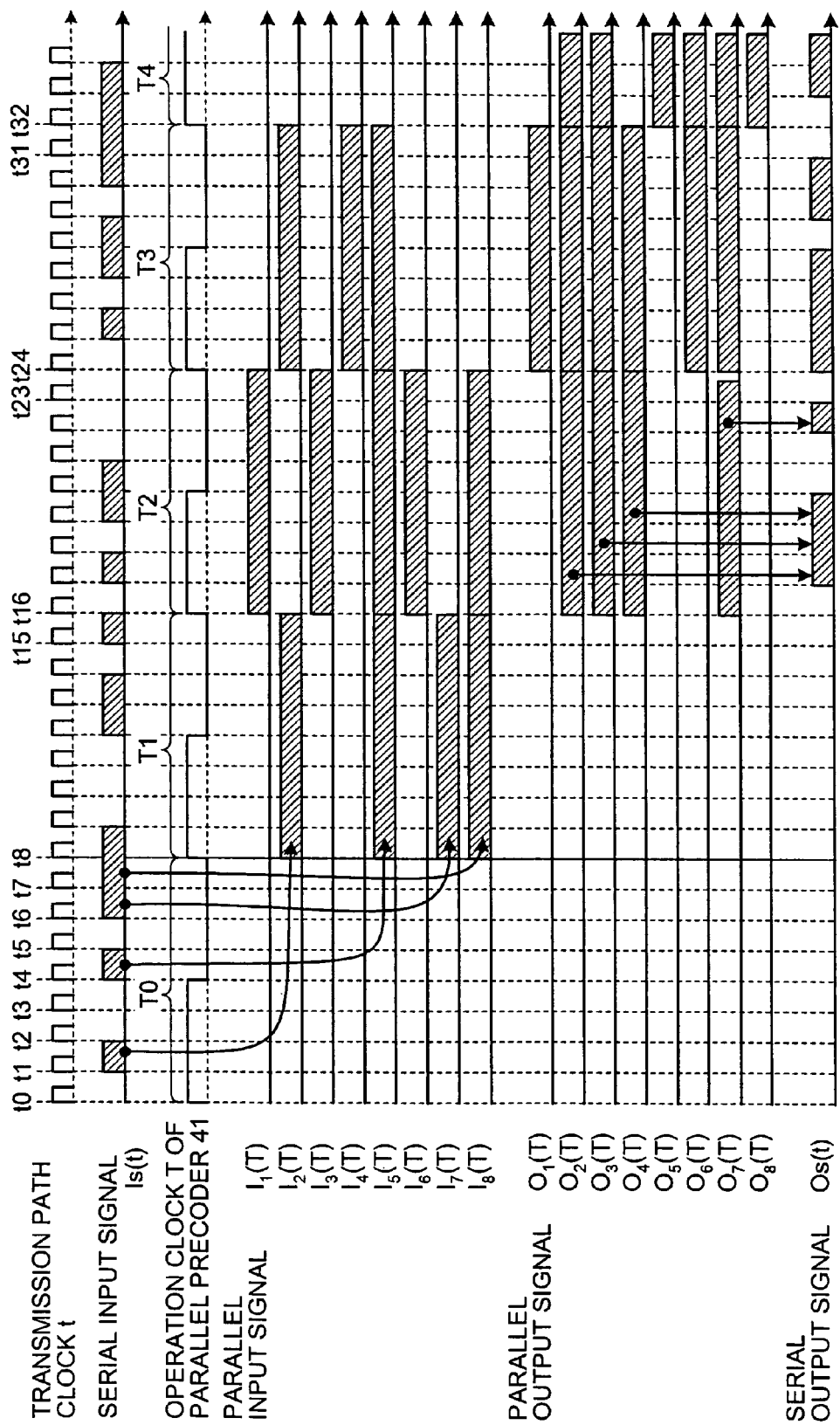
FIG. 5 is a timing chart for explaining an operation of the duobinary-signal parallel precoder circuit shown in FIG. 4.

FIG. 5 is a timing chart for explaining an operation of the duobinary-signal parallel precoder circuit shown in FIG. 4. A signal in parallelized into 8-bit (n=8) signals. The operation clock T of the parallel precoder circuit has eight cycles, that is 8t, and the operation clock T is expressed as T0 to T4 in FIG. 5. The parallel output signals $O_1(T)$ to $O_8(T)$ of the parallel precoder circuit 41 up to the rise (time t0 to time t16) of the operation clock T2 are all "0" ("L" in FIG. 4).

First, the demultiplexing circuit 42 serial-parallel converts the serial input signal $I_s(t)$ into 8-bit parallel input signals $I_1(T)$ to $I_8(T)$. In FIG. 5, at time t8, "0" of the serial input signal $I_s(0)$ at time t0 is input to the parallel precoder circuit 41 as the parallel input signal $I_1(T1)$, "1" of the serial input signal $I_s(1)$ at time t1 is input to the parallel precoder circuit 41 as the parallel input signal $I_2(T1)$, "0" of the serial input signal $I_s(2)$ at time t2 is input to the parallel precoder circuit 41 as the parallel input signal $I_3(T1)$, "0" of the serial input signal $I_s(3)$ at time t3 is input to the parallel precoder circuit 41 as the parallel input signal $I_4(T1)$, "1" of the serial input signal $I_s(4)$ at time t4 is input to the parallel precoder circuit

41 as the parallel input signal $I_s(T1)$, "0" of the serial input signal $I_s(5)$ at time t5 is input to the parallel precoder circuit 41 as the parallel input signal $I_6(T1)$, "1" of the serial input signal $I_s(6)$ at time t6 is input to the parallel precoder circuit 41 as the parallel input signal $I_7(T1)$, and "1" of the serial input signal $I_s(7)$ at time t7 is input to the parallel precoder circuit 41 as the parallel input signal $I_8(T1)$.

At time t8, the parallel precoder circuit starts the 8-bit parallel output signals $O_1(T)$ to $O_8(T)$ following Equation (1). Specifically, because the first-bit parallel output signal $O_1(T)$ has i=1 and n=8 in Equation (1), the first-bit parallel output signal $O_1(T)$ becomes "0" based on $O_1(T)=O_8(T-1)*I_1(T)=0*0$. Because the second-bit parallel output signal $O_2(T)$ has i=2 and n=8 in Equation (1), the second-bit parallel output signal $O_2(T)$ becomes "1" based on $O_2(T)=O_8(T-1)*I_1(T)*I_2(T)=0*0*1$. Similarly, by substituting 3, 4, 5, 6, 7, and 8 into i in Equation (1), the parallel output signals $O_3(T)$ to $O_8(T)$ are calculated. As a result, the third-bit parallel output signal $O_3(T)$ becomes "1", the fourth-bit parallel output signal $O_3(T)$ becomes "1", the fifth-bit parallel output signal $O_5(T)$ becomes "0", the sixth-bit parallel output signal $O_6(T)$ becomes "0", the seventh-bit parallel output signal $O_7(T)$ becomes "1", and the eighth-bit parallel output signal $O_8(T)$ becomes "0".

At time t16, the parallel precoder circuit 41 outputs a result of the calculation carried out during time t8 to time 16, that is, within the operation clock T1, to the 8-bit parallel output signals $O_1(T)$ to $O_8(T)$. In this case, the parallel precoder circuit 41 outputs "0", "1", "1", "1", "0", "0", and "1" to the parallel output signals $O_1(T)$ to $O_8(T)$.

The multiplexing circuit 43 parallel-serial converts the parallel output signals $O_1(T)$ to $O_8(T)$, and outputs "0" as the parallel output signal $O_1(T)$ to the serial output signal $O_s(t)$ at time t16, outputs "1" as the parallel output signal $O_2(T)$ to the serial output signal $O_s(t)$ at time t17, outputs "1" as the parallel output signal $O_3(T)$ to the serial output signal $O_s(t)$ at time t18, outputs "1" as the parallel output signal $O_4(T)$ to the serial output signal $O_s(t)$ at time t19, outputs "0" as the parallel output signal $O_5(T)$ to the serial output signal $O_s(t)$ at time t20, outputs "0" as the parallel output signal $O_6(T)$ to the serial output signal $O_s(t)$ at time t21, outputs "1" as the parallel output signal $O_7(T)$ to the serial output signal $O_s(t)$ at time t22, and outputs "0" as the parallel output signal $O_8(T)$ to the serial output signal $O_s(t)$ at time t23.

When "0100101110001101010 . . . " is input from time t0 as the serial input signal $I_s(t)$ to the duobinary signal precoder circuit shown in FIG. 4, the duobinary signal precoder circuit outputs "1110010111110110011 . . . " as the serial output signal $O_s(t)$ from time t17. Therefore, it is clear that the operation of the precoder circuit before the parallelization shown in FIG. 3 is equivalent to the operation of the duobinary-signal parallel precoder circuit shown in FIG. 4.

As explained above, when the parallel precoder circuit is designed to satisfy Equation (1), the precoder circuit of the parallelized duobinary transmission and reception system can be realized.

The EXOR circuit 1a-(2k, 1) in the first column outputs a result of EXOR calculating the parallel input $I_{2k}$ and the parallel input $I_{2k-1}$. The EXOR circuit 1a-(2k, 2) in the second column outputs a result of EXOR calculating the EXOR circuit 1a-(2k−2, 1) and the EXOR circuit 1a-(2k, 1). Therefore, the result of calculation by the EXOR circuit 1a-(2k, 2) is equal to the result of EXOR calculating four inputs of the parallel inputs $I_{2k}$ to $I_{2k-3}$.

In the 8-bit parallel precoder circuit shown in FIG. 1, when the output of the EXOR circuit 1a-(1, 0) in the first row and the zeroth column is $II_1$ and when the EXOR operator is "*", an output EXO1a-(2, 1) of the EXOR circuit 1a-(2, 1) in the second row and the first column can be given by $$EXO1a\text{-}(2,1)=II_1*I_2 \tag{2-1}$$

An output EXO1a-(4, 1) of the EXOR circuit 1a-(4, 1) in the fourth row and the first column can be given by $$EXO1a\text{-}(4,1)=I_3*I_4 \tag{2-2}$$

An output EXO1a-(6, 1) of the EXOR circuit 1a-(6, 1) in the sixth row and the first column can be given by $$EXO1a\text{-}(6,1)=I_5*I_6 \tag{2-3}$$

An output EXO1a-(8, 1) of the EXOR circuit 1a-(8, 1) in the eighth row and the first column can be given by $$EXO1a\text{-}(8,1)=I_7*I_8 \tag{2-4}$$

Equations (2-1) to (2-4) are hereinafter also referred to as Equations (2).

An output EXO1a-(4, 2) of the EXOR circuit 1a-(4, 2) in the fourth row and the second column can be given by $$EXO1a\text{-}(4,2)=EXO1a\text{-}(2,1)*EXO1a\text{-}(4,1) \tag{3-1}$$

An output EXO1a-(6, 2) of the EXOR circuit 1a-(6, 2) in the sixth row and the second column can be given by $$EXO1a\text{-}(6,2)=EXO1a\text{-}(4,1)*EXO1a\text{-}(6,1) \tag{3-2}$$

An output EXO1a-(8, 2) of the EXOR circuit 1a-(8, 2) in the eighth row and the second column can be given by $$EXO1a\text{-}(8,2)=EXO1a\text{-}(6,1)*EXO1a\text{-}(8,1) \tag{3-3}$$

Based on Equations (2), Equations (3-1) to (3-3) become $$EXO1a\text{-}(4,2)=II_1*I_2*I_3*I_4 \tag{4-1}$$

$$EXO1a\text{-}(6,2)=I_3*I_4*I_5*I_6 \tag{4-2}$$

$$EXO1a\text{-}(8,2)=I_5*I_6*I_7*I_8 \tag{4-3}$$

Equations (4-1) to (4-3) are hereinafter also referred to as Equations (4).

The EXOR circuit 1a-(2k, 3) in the third column outputs a result of EXOR calculating the parallel input $I_{2k}$ and the parallel input $I_{2k-4}$. The output of the EXOR circuit 1a-(2k, 3) is equal to a result of EXOR calculating the parallel inputs $I_{2k}$ to $I_{2k-7}$ (corresponding to the output of the EXOR circuit 1a-(8, 3) in FIG. 1). When 2k−7 is equal to or smaller than 0 (corresponding to the output of the EXOR circuit 1a-(6, 3)), the output of the EXOR circuit 1a-(2k, 3) is equal to a result of EXOR calculating the parallel inputs $I_1$ to $I_{2k-7}$.

In FIG. 1, the output EXOR1a-(6, 3) of the EXOR circuit 1a-(6, 3) in the sixth row and the third column can be given by $$EXO1a\text{-}(6,3)=EXO1a\text{-}(2,1)*EXO1a\text{-}(6,2) \tag{5-1}$$

The output EXOR1a-(8, 3) of the EXOR circuit 1a-(8, 3) in the eighth row and the third column can be given by $$EXO1a\text{-}(8,3)=EXO1a\text{-}(4,2)*EXO1a\text{-}(8,2) \tag{5-2}$$

Based on Equations (2) and Equations (4), Equations (5-1) and (5-2) become $$EXO1a\text{-}(6,3)=II_1*I_2*I_3*I_4*I_5*I_6 \tag{6-1}$$

$$EXO1a\text{-}(8,3)=II_1*I_2*I_3*I_4*I_5*I_6*I_7*I_8 \tag{6-2}$$

Equations (6-1) and (6-2) are hereinafter also referred to as Equations (6).

The outputs EXOR1a-(2, 1), 1a-(4, 2), 1a-(6, 3), and 1a-(8, 3) of the EXOR circuits 1a-(2, 1), 1a-(4, 2), 1a-(6, 3), and 1a-(8, 3) in the (2k)th row are input to the delay circuits 1b-2, 1b-4, 1b-6, and 1b-8, and are delayed by one clock, thereby becoming the parallel outputs $O_2$, $O_4$, $O_6$, and $O_8$. As shown in Equations (2), Equations (4), and Equations (6), the parallel outputs $O_2$, $O_4$, $O_6$, and $O_8$ are obtained by EXOR calculating the parallel output $O_8$ one clock before, and all the parallel inputs $I_1$ to $I_8$ that are positioned before in time series in the parallel inputs $I_1$ to $I_8$. The parallel outputs $O_2$, $O_4$, $O_6$, and $O_8$ satisfy Equation (1).

A result of EXOR calculating the parallel input $I_{2k-1}$ and the input to the delay circuit 1b-2(k-1) by the EXOR circuit 1a-(2k-1, 4) is input to the delay circuit 1b-(2k-1) in the odd row, and one-clock delayed parallel outputs $O_3$, $O_5$, and $O_7$ are generated.

In FIG. 1, the output EXOR1a-(3, 4) of the EXOR circuit 1a-(3, 4) in the third row and the fourth column can be given by $$EXO1a\text{-}(3,4)=EXO1a\text{-}(2,1)*I_3 \qquad (7\text{-}1)$$

The output EXOR1a-(5, 4) of the EXOR circuit 1a-(5, 4) in the fifth row and the fourth column can be given by $$EXO1a\text{-}(5,4)=EXO1a\text{-}(4,2)*I_5 \qquad (7\text{-}2)$$

The output EXOR1a-(7, 4) of the EXOR circuit 1a-(7, 4) in the seventh row and the fourth column can be given by $$EXO1a\text{-}(7,4)=EXO1a\text{-}(6,3)*I_7 \qquad (7\text{-}3)$$

Based on Equations (2), Equations (4), and Equations (6), Equations (7-1) to (7-3) become $$EXO1a\text{-}(3,4)=II_1*I_2*I_3 \qquad (8\text{-}1)$$

$$EXO1a\text{-}(5,4)=II_1*I_2*I_3*I_4*I_5 \qquad (8\text{-}2)$$

$$EXO1a\text{-}(7,4)=II_1*I_2*I_3*I_4*I_5*I_6*I_7 \qquad (8\text{-}3)$$

Equations (8-1) to (8-3) are hereinafter also referred to as Equations (8).

As is clear from Equations (2) to (8), the n-bit parallel precoder circuit according to the first embodiment becomes equivalent to the serial precoder circuit.

Figure 6:
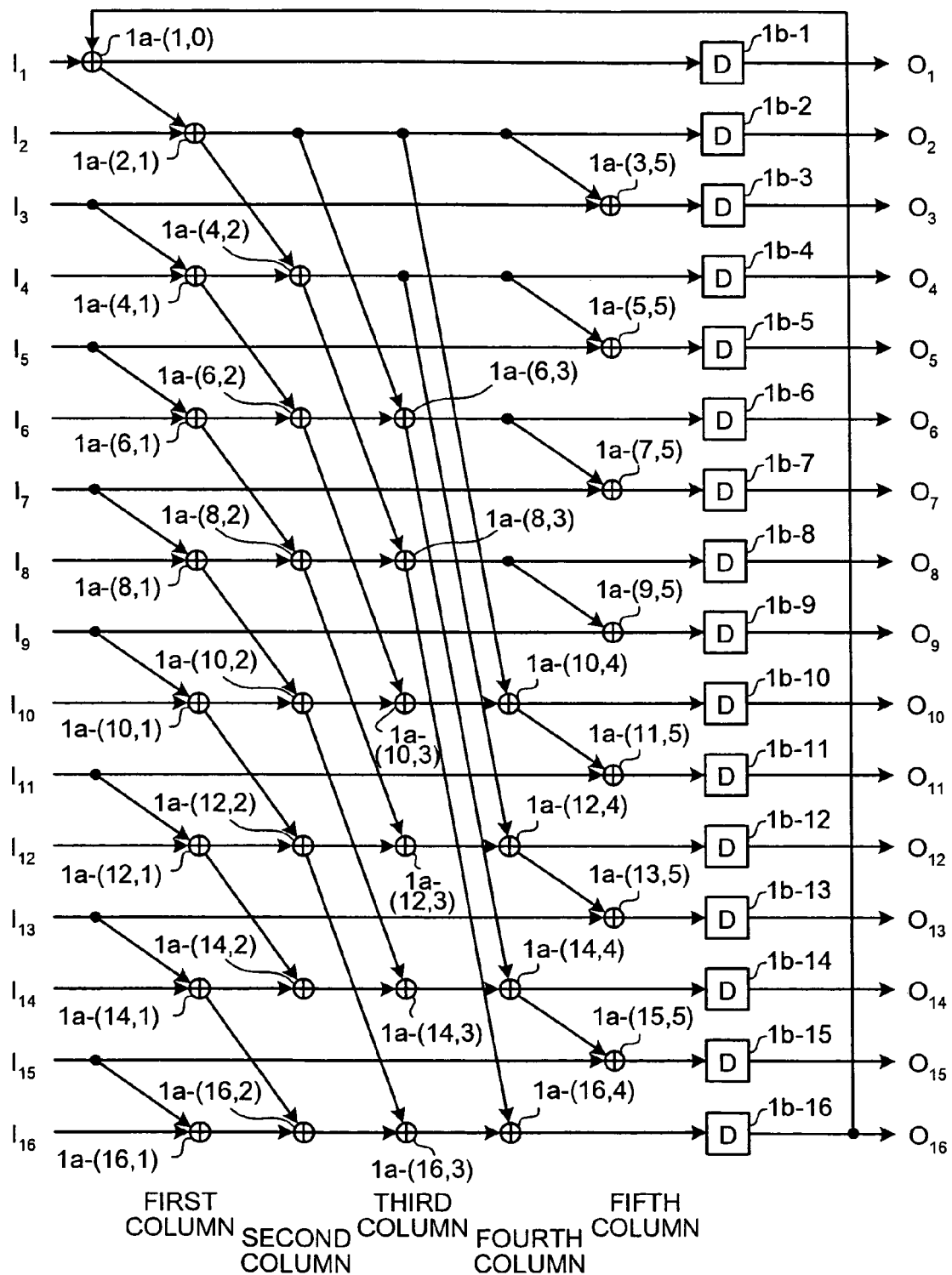
FIG. 6 is a schematic for illustrating another example of a configuration of a parallel precoder circuit according to a first embodiment.

While the configuration of the n-bit parallel precoder circuit where n=8 is shown FIG. 1, a parallel precoder circuit that is developed in a higher bit width can be also obtained by recursively configuring the EXOR circuit as shown in the first embodiment. FIG. 6 depicts a configuration of a parallel precoder circuit when n=16.

The bit width n for parallel development is not particularly limited to the power of two. For example, when n=7, a parallel precoder circuit that satisfies Equation (1) can be obtained by deleting the EXOR circuits 1a-(8, 1), 1a-(8, 2), and 1a-(8, 3) in the eighth row and the delay circuit 1b-8, and by feedbacking the output of the delay circuit 1b-7 to the EXOR circuit 1a-(1, 0) in FIG. 1.

As explained above, according to the first embodiment, the EXOR circuit in the zeroth column executes the EXOR calculation by using the output of the delay circuit in the nth row as one input, and using the parallel input in the first row as the other input. The EXOR circuit in the (2k)th row and the first column executes the EXOR calculation by using the parallel input in the (2k)th row as one input, and using the output of the EXOR circuit in the zeroth column as the other input when the value of k is 1, or using the parallel signal in the (2k−1)th row as the other input when the value of k is larger than 1. The EXOR circuit in the (2k)th row and the mth column executes the EXOR calculation by using the output of the EXOR circuit in the (2k)th row and the (m−1)th column as one input when $2k-2^{\wedge}(m-1)$ is equal to or larger than 1, and using the output of the EXOR circuit in the (2k−2^(m−1))th row and the (m−1)-column as the other input when the EXOR circuit is disposed in the (2k−2^(m−1))th row and the (m−1)th column, or using the output of the EXOR circuit having a largest column number among EXOR circuits disposed in the (2k−2^(m−1))th row as the other input when no EXOR circuit is disposed in the (2k−2^(m−1))th row and the (m−1)th column. The EXOR circuit in the (2k−1)th row and the hth column executes the EXOR calculation by using the parallel signal in the (2k−1)th row as one input, and using the output of the EXOR circuit having a largest column number among EXOR circuits disposed in the (2k−2)th row as the other input. The delay circuits in the first to the nth rows delay the output of the EXOR circuit having a largest column number among EXOR circuits disposed in the first to the nth rows respectively, and use the delayed results as the parallel outputs in the first to the nth rows.

In other words, the parallel precoder circuit according to the first embodiment executes the EXOR calculation by dividing data into plural groups, and obtains a result by further executing EXOR calculation at divided stages. Therefore, a parallel precoder having a small circuit delay can be obtained.

Specifically, according to the conventional parallel precoder circuit described in Japanese Patent Application Laid-open No. H11-122205, when a serial input is developed into n bits, a delay at n stages occurs in the EXOR circuit. However, according to the parallel precoder circuit in the first embodiment, a maximum delay path can be decreased to $\log_2 n+1$ stages. For example, when n=8, a delay occurs at four stages, and when n=16, a delay occurs at five stages.

For example, in the case of an optical communication at an ultra-high speed transmission path clock of 40 Gbit/second, an ultra-high multiple parallel development of n=256 is often carried out in the circuit operation clock of 160 megahertz. In this case, according to the conventional parallel precoder circuit described in Japanese Patent Application Laid-open No. H11-122205, EXOR circuits at 256 stages need to operate in one clock. On the other hand, according to the parallel precoder circuit in the first embodiment, the number of stages of EXOR circuits that operate in one clock can be decreased to $\log_2 256+1=9$ stages. Therefore, the required operation speed of circuits used can be decreased.

Furthermore, according to the first embodiment, EXOR circuits are disposed in a grating shape of n rows×$\log_2 n$ columns. Therefore, a total number of EXOR circuits that constitute the parallel precoder circuit becomes smaller than n×$\log_2 n$. Consequently, a circuit scale can be decreased to within n×$\log_2 n$. In other words, the scale of the parallel precoder circuit according to the first embodiment becomes smaller than that of the conventional parallel precoder circuit that generates output signals of the parallel precoder circuit from the parallel-developed input signals.

Figure 7:
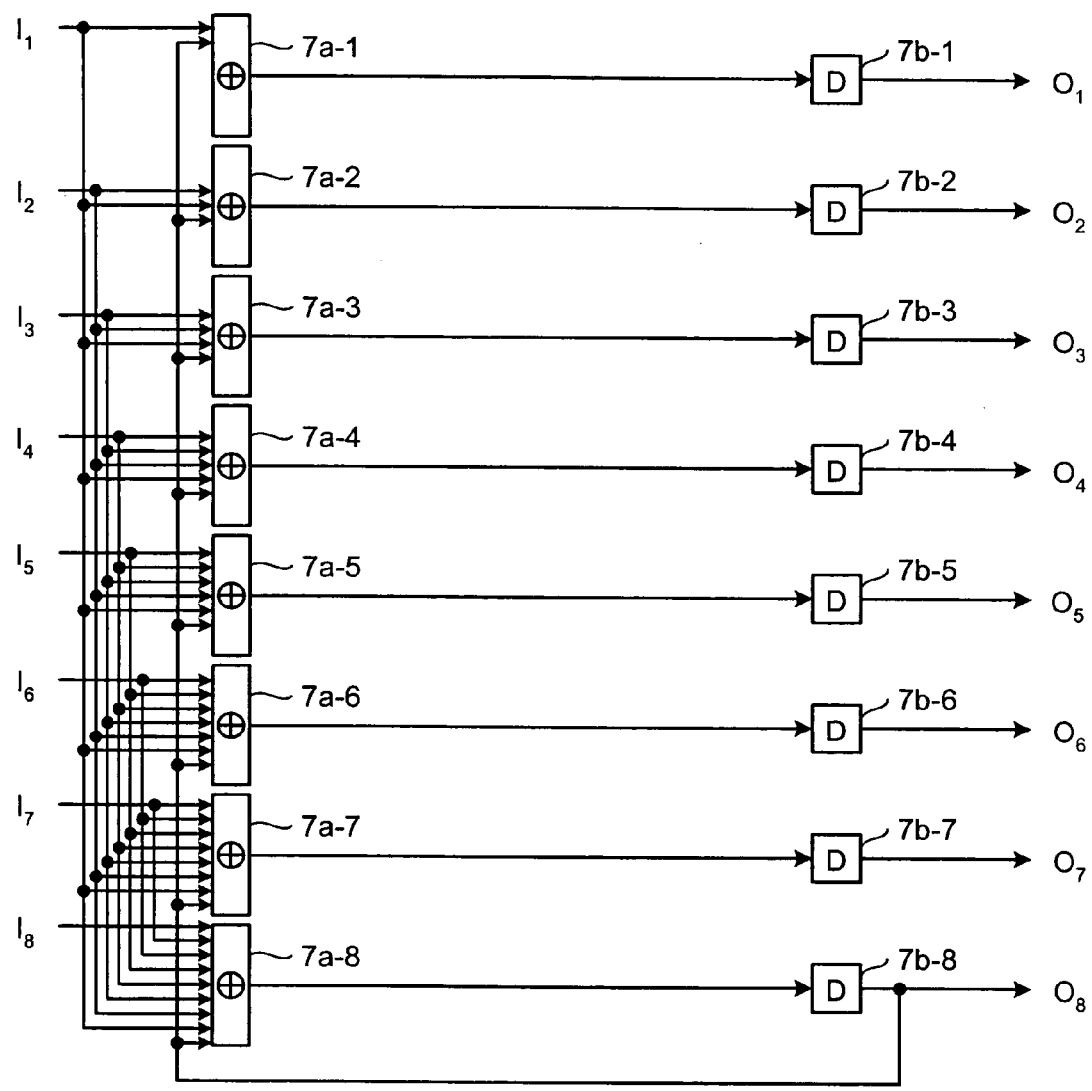
FIG. 7 is a schematic of a configuration of a parallel precoder circuit that generates individual output signals from input signals developed in parallel.

FIG. 7 is a schematic of a configuration of a parallel precoder circuit that generates individual output signals from input signals developed in parallel. A parallel development bit width is n=8. The parallel precoder circuit includes a two-input EXOR circuit 7a-1, a three-input EXOR circuit 7a-2, a four-input EXOR circuit 7a-3, a five-input EXOR circuit 7a-4, a six-input EXOR circuit 7a-5, a seven-input EXOR circuit 7a-6, an eight-input EXOR circuit 7a-7, a nine-input EXOR circuit 7a-8, and delay circuits (D in FIG. 7) 7b-1 to 7b-8 that delay the outputs of the EXOR circuits 7a-1 to 7a-8 by one clock.

The output of the delay circuit 7b-8 and the parallel input $I_1$ are input to the EXOR circuit 7a-1. The output of the delay circuit 7b-8 and the parallel inputs $I_1$ and $I_2$ are input to the EXOR circuit 7a-2. The output of the delay circuit 7b-8 and the parallel inputs $I_1$ to $I_3$ are input to the EXOR circuit 7a-3. The output of the delay circuit 7b-8 and the parallel inputs $I_1$ to $I_4$ are input to the EXOR circuit 7a-4. The output of the delay circuit 7b-8 and the parallel inputs $I_1$ to $I_5$ are input to the EXOR circuit 7a-5. The output of the delay circuit 7b-8 and the parallel inputs $I_1$ to $I_6$ are input to the EXOR circuit 7a-6. The output of the delay circuit 7b-8 and the parallel inputs $I_1$ to $I_7$ are input to the EXOR circuit 7a-7. The output of the delay circuit 7b-8 and the parallel inputs $I_1$ to $I_8$ are input to the EXOR circuit 7a-8.

In other words, EXOR circuits 7a-k (in this case, $1 \leq k \leq 8$) are EXOR circuits of (k+1) inputs. Outputs of the EXOR circuits are connected to delay circuits 7b-k. Parallel inputs $I_1$ to $I_k$ not larger than k and the output of the delay circuit 7b-8 are connected to the multiple-input EXOR circuits 7a-k.

Figure 8A:
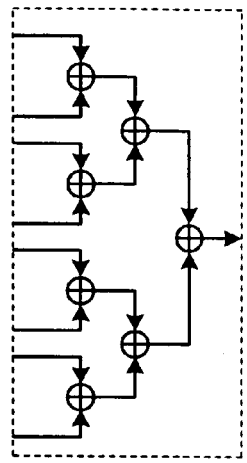
FIGS. 8A to 8C are schematics for illustrating examples of a configuration of multiple-input EXOR circuits.
Figure 8B:
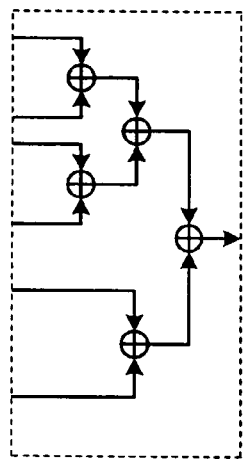
Figure 8C:
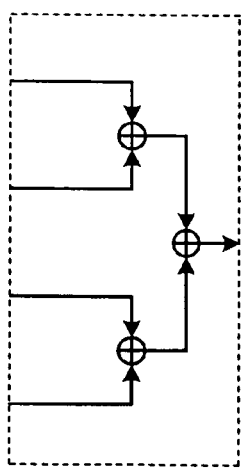

FIGS. 8A to 8C are schematics for illustrating examples of a configuration of multiple-input EXOR circuits. The multiple-input EXOR circuits are realized by connecting two-input EXOR circuits in a tree shape. FIG. 8A depicts a configuration diagram of four-input EXOR circuits, FIG. 8B depicts a configuration diagram of six-input EXOR circuits, and FIG. 8C depicts a configuration diagram of eight-input EXOR circuits.

As shown in FIGS. 8A to 8C, in the configuration of connecting two-input EXOR circuits in a tree shape, although the number of delay stages of n-input EXOR circuits can be decreased to $\log_2 n$, (n−1) two-input EXOR circuits become necessary. Therefore, in the parallel precoder circuit of the configuration shown in FIG. 7, n×n/2 EXOR circuits are necessary in total. Consequently, the parallel precoder circuit of the configuration shown in the first embodiment (see FIG. 1, for example) can have a smaller circuit scale.

A parallel precoder circuit according to a second embodiment of the present invention is explained below with reference to FIG. 9. The parallel precoder circuit according to the second embodiment calculates parallel outputs $O_1$ to $O_n$ from n ($2 \leq n$, where n is an integer) bit parallel inputs $I_1$ to $I_n$.

The parallel precoder circuit according to the second embodiment includes EXOR circuits 9a (9a-(i, j)) having different number of inputs, and delay circuits 9b (9b-1 to 9b-n) that consist of flip-flops and that delay input signals by a unit time, and output delayed signals. A maximum number of inputs of the EXOR circuits 9a is r ($2 \leq r$, where r is an integer). The output of the multiple-input EXOR circuits becomes "1" when an odd number of "1" are input, and becomes "0" when an even number of "1" are input, as explained in the first embodiment.

In the parallel precoder circuit according to the second embodiment, the EXOR circuits 9a and the delay circuits 9b are connected together in a net configuration as described later, in a similar manner to that according to the first embodiment. Each of the EXOR circuits 9a-(i, j) is disposed in an ith row and a jth column. The ith row EXOR circuit is an EXOR circuit disposed in a signal path that connects between a parallel input $I_i$ and the delay circuit 1b-i. The jth column EXOR circuit is a jth EXOR circuit from the parallel input $I_i$ among EXOR circuits where i is a multiple of the maximum number of inputs r. An EXOR circuit in the ith row where i is not a multiple of r other than 1 and is at a pre-stage of the delay circuit 9b-i is the EXOR circuit in the last column of an hth column. The value of h is a smallest integer equal to or above $\log_r n+1$. For example, the maximum number of inputs r is "4" and when the number of bits n is "14", h becomes "3".

Figure 9:
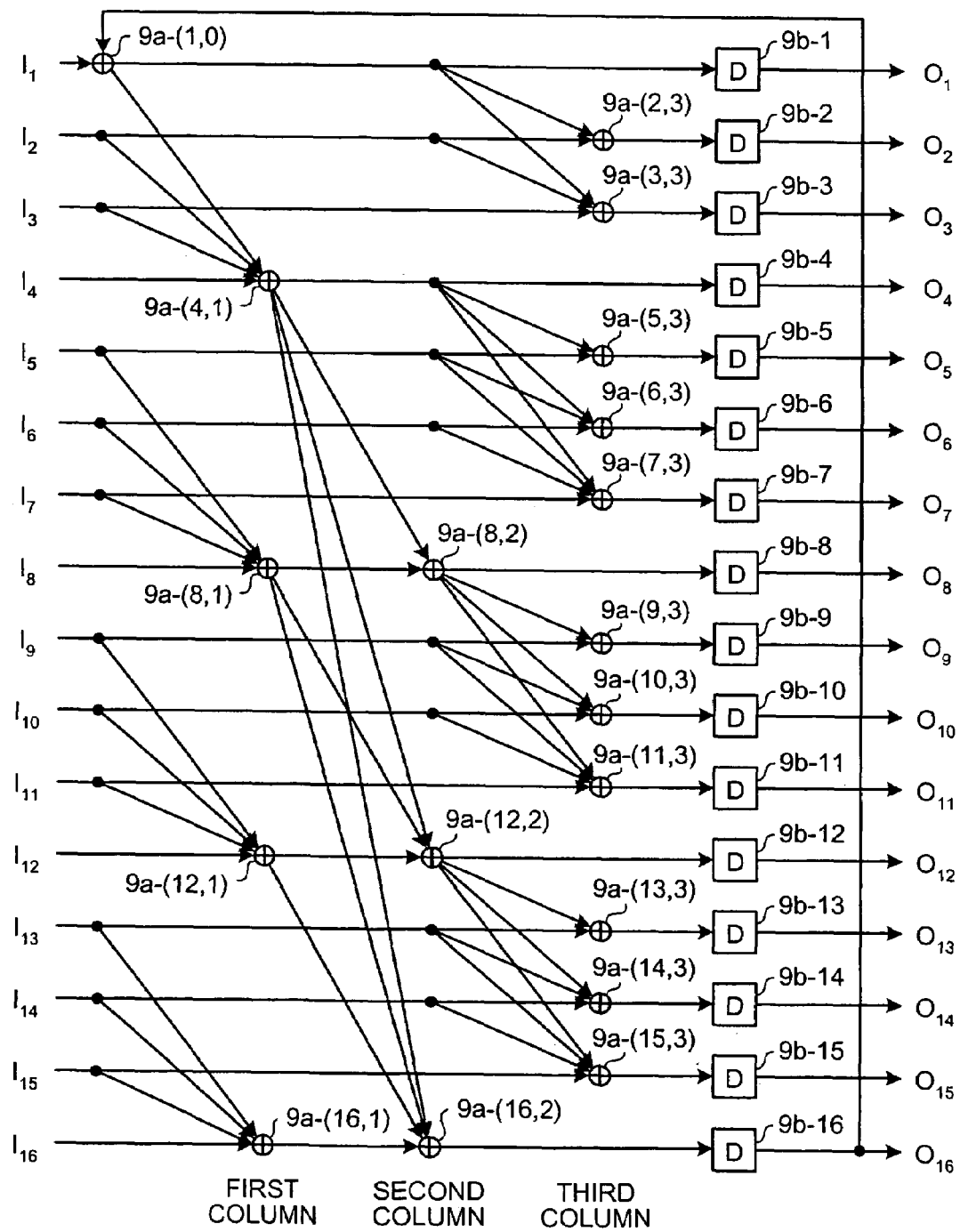
FIG. 9 is a schematic for illustrating an example of a configuration of a parallel precoder circuit according to a second embodiment of the present invention.

FIG. 9 is a schematic for illustrating an example of a configuration of a parallel precoder circuit according to the second embodiment, where "the maximum number of inputs r=4" and "the number of bits n=16". The parallel precoder circuit includes the EXOR circuit 9a (9a-(1, 0), 9a-(2, 3), 9a-(3, 3), 9a-(4, 1), 9a-(5, 3), 9a-(6, 3), 9a-(7, 3), 9a-(8, 1), 9a-(8, 2), 9a-(9, 3), 9a-(10, 3), 9a-(11, 3), 9a-(12, 1), 9a-(12, 2), 9a-(13, 3), 9a-(14, 3), 9a-(15, 3), 9a-(16, 1), and 9a-(16, 1)), and delay circuits (D in FIG. 9) 9-b (9b-1 to 9b-16).

The EXOR circuit 9a-(1, 0) is a two-input EXOR circuit disposed in the first row and the zeroth column, the EXOR circuit 9a-(2, 3) is a two-input EXOR circuit disposed in the second row and the third column, the EXOR circuit 9a-(3, 3) is a three-input EXOR circuit disposed in the third row and the third column, the EXOR circuit 9a-(4, 1) is an r-input (in this case, a four-input) EXOR circuit disposed in the fourth row and the first column, the EXOR circuit 9a-(5, 3) is a two-input EXOR circuit disposed in the fifth row and the third column, the EXOR circuit 9a-(6, 3) is a three-input EXOR circuit disposed in the sixth row and the third column, the EXOR circuit 9a-(7, 3) is a four-input EXOR circuit disposed in the seventh row and the third column, the EXOR circuit 9a-(8, 1) is a four-input EXOR circuit disposed in the eighth row and the first column, the EXOR circuit 9a-(8, 2) is a two-input EXOR circuit disposed in the eighth row and the second column, the EXOR circuit 9a-(9, 3) is a two-input EXOR circuit disposed in the ninth row and the third column, the EXOR circuit 9a-(10, 3) is a three-input EXOR circuit disposed in the tenth row and the third column, the EXOR circuit 9a-(11, 3) is a four-input EXOR circuit disposed in the eleventh row and the third column, the EXOR circuit 9a-(12, 1) is a four-input EXOR circuit disposed in the twelfth row and the first column, the EXOR circuit 9a-(12, 2) is a three-input EXOR circuit disposed in the twelfth row and the second column, the EXOR circuit 9a-(13, 3) is a two-input EXOR circuit disposed in the thirteenth row and the third column, the EXOR circuit 9a-(14, 3) is a three-input EXOR circuit disposed in the fourteenth row and the third column, the EXOR circuit 9a-(15, 3) is a four-input EXOR circuit disposed in the fifteenth row and the third column, the EXOR circuit 9a-(16, 1) is a four-input EXOR circuit disposed in the sixteenth row and the first column, and the EXOR circuit 9a-(16, 2) is a four-input EXOR circuit disposed in the sixteenth row and the second column. The third column is the last column.

A parallel input $I_r \times_k$, a parallel input $I_r \times_{k-1}$, a parallel input $I_r \times_{k-2}$, . . . , and a parallel input $I_r \times_{k-r+1}$ are connected to the input of the EXOR circuit 9a-(r×k, 1) in the (r×k)th row and the first column. However, instead of the parallel input $I_1$, the output of the EXOR circuit 9a-(1, 0) in the first row and the zeroth column is connected to the EXOR circuit 9a-(r, 1) in the rth row and the first column. In the above, k is an integer that satisfies "$1 \leq k \leq n/r$".

In FIG. 9, the output of the EXOR circuit 9a-(1, 0) and the parallel inputs $I_2$ to $I_4$ are connected to the EXOR circuit 9a-(4, 1). The parallel inputs $I_5$ to $I_8$ are connected to the EXOR circuit 9a-(8, 1). The parallel inputs $I_9$ to $I_{12}$ are connected to the EXOR circuit 9a-(12, 1). The parallel inputs $I_{13}$ to $I_{16}$ are connected to the EXOR circuit 9a-(16, 1).

The outputs of the EXOR circuit 9a-(r×k−(r−1)×r^(m−1), m−1), . . . , the EXOR circuit 9a-(r×k−p×r−^(m−1), m−1), . . . , and the EXOR circuit 9a-(r×k−, m−1) are connected to the input of the EXOR circuit 9a-(r×k, m) in the (r×k)th row and the mth column. However, when no EXOR circuit is disposed in the (r×k−p×r^(m−1))th row and the (m−1)th column, the output of the EXOR circuit in the jth column having a largest column number j among EXOR circuits that are present in the (r×k−p×r^(m−1))th row is connected to the input of the EXOR circuit 9a-(r×k, m).

When r×k−p×r^(m−1) is smaller than "1", one of the inputs of the r-input EXOR circuits 9a-(r×k, m) is kept blank. When the input is only one output of the EXOR circuit 9a-(r×k, m−1), no EXOR circuit is disposed. For example, in FIG. 9, the outputs of the EXOR circuits 9a-(4, 1), 9a-(8, 1), and 9a-(12, 1) are connected to the input of the of the EXOR circuits 9a-(12, 2). In the above, m is an integer that satisfies "2≦m≦h−1", and p is an integer that satisfies "0≦m≦r−1".

The parallel input $I_r×_{k-1}$, the parallel input $I_r×_{k-2}$, ..., and the parallel input $I_r×_{k-q}$, and the output of the EXOR circuit 9a-(r×k−r, h−1) are connected to the input of the EXOR circuit 9a-(r×k−q, h) in the (r×k−q)th row and the hth column disposed in the last column. However, no EXOR circuit is disposed in the first row and the last column. In the above, q is an integer that satisfies "1≦q≦r−1".

The output of the EXOR circuit in the jth column having a largest column number j among EXOR circuits disposed in the (r×k)th row is connected to the input of the delay circuit 9b-(r×k) in the (r×k)th row. The output of the EXOR circuit 9a-(r×k−p, h) in the last column of the hth column and the (r×k−p)th row is connected to the input of the delay circuit 9b-(r×k−p) in the (r×k−p)th row. However, the output of the EXOR circuit 9a-(1, 0) is connected to the input of the delay circuit 9b-1 in the first-row. The output of the delay circuit 9b-i becomes the parallel output $O_i$.

The EXOR circuit 9a-(r×k, 1) in the first column outputs a result of EXOR calculating the parallel inputs $I_r×_{k-r+1}$ to $I_r×_k$. The EXOR circuit 9a-(r×k, 2) in the second column outputs a result of EXOR calculating the output of the EXOR circuits 9a-(r×k−(r−1)×r, 1) to 9a-(r×k, 1). In other words, the output of the EXOR circuit 9a-(r×k, 2) is equivalent to the result obtained by EXOR calculating the parallel inputs $I_r×_{k-r+1}$ to $I_r×_k$.

In the 16-bit parallel precoder circuit shown in FIG. 9, when the output of the EXOR circuit 9a-(1, 0) in the first row and the zeroth column is $II_1$ and when the EXOR operator is "*", an output EXO9a-(4, 1) of the EXOR circuit 9a-(4, 1) in the fourth row and the first column can be given by $$EXO9a\text{-}(4,1) = II_1 * I_2 * I_3 * I_4 \tag{9-1}$$

An output EXO9a-(8, 1) of the EXOR circuit 9a-(8, 1) in the eighth row and the first column can be given by $$EXO9a\text{-}(8,1) = I_5 * I_6 * I_7 * I_8 \tag{9-2}$$

An output EXO9a-(12, 1) of the EXOR circuit 9a-(12, 1) in the twelfth row and the first column can be given by $$EXO9a\text{-}(12,1) = I_9 * I_{10} * I_{11} * I_{12} \tag{9-3}$$

An output EXO9a-(16, 1) of the EXOR circuit 9a-(16, 1) in the sixteenth row and the first column can be given by $$EXO9a\text{-}(16,1) = I_{13} * I_{14} * I_{15} * I_{16} \tag{9-4}$$

Equations (9-1) to (9-4) are hereinafter also referred to as Equations (9).

An output EXO9a-(8, 2) of the EXOR circuit 9a-(8, 2) in the eighth row and the second column can be given by $$EXO9a\text{-}(8,2) = EXO9a\text{-}(4,1) * EXO9a\text{-}(8,1) \tag{10-1}$$

An output EXO9a-(12, 2) of the EXOR circuit 9a-(12, 2) in the twelfth row and the second column can be given by $$EXO9a\text{-}(12,2) = EXO9a\text{-}(4,1) * EXO9a\text{-}(8,1) * EXO9a\text{-}(12,1) \tag{10-2}$$

An output EXO9a-(16, 2) of the EXOR circuit 9a-(16, 2) in the sixteenth row and the second column can be given by $$EXO9a\text{-}(16,2) = EXO9a\text{-}(4,1) * EXO9a\text{-}(8,1) * EXO9a\text{-}(12,1) * EXO9a\text{-}(16,1) \tag{10-3}$$

Based on Equations (9), Equations (10-1) to (10-3) become $$EXO9a - (8, 2) = II_1 * I_2 * I_3 * I_4 * I_5 * I_6 * I_7 * I_8 \tag{11-1}$$

$$EXO9a - (12, 2) = II_1 * I_2 * I_3 * I_4 * I_5 * I_6 * I_7 * I_8 * I_9 * I_{10} * I_{11} * I_{12} \tag{11-2}$$

$$EXO9a - (16, 2) = II_1 * I_2 * I_3 * I_4 * I_5 * I_6 * I_7 * I_8 * I_9 * I_{10} * I_{11} * I_{12} * I_{13} * I_{14} * I_{15} * I_{16} \tag{11-3}$$

Equations (11-1) to (11-3) are hereinafter also referred to as Equations (11).

The outputs EXO9a-(4, 1), 9a-(8, 2), 9a-(12, 2), and 9a-(16, 2) of the EXOR circuits 9a-(4, 1), 9a-(8, 2), 9a-(12, 2), and 9a-(16, 2) in the (4k)th row are input to the delay circuits 9b-4, 9b-8, 9b-12, and 9b-16, delayed by one clock, and become parallel outputs $O_4$, $O_8$, $O_{12}$, and $O_{16}$. As shown in Equation (9) and (11), the parallel outputs $O_4$, $O_8$, $O_{12}$, and $O_{16}$ are obtained by EXOR calculating the parallel output $O_{16}$ one clock before, and all the parallel inputs $I_1$ to $I_{16}$ that are positioned before in time series in the parallel inputs $I_1$ to $I_{16}$. The parallel outputs $O_4$, $O_8$, $O_{12}$, and $O_{16}$ satisfy Equation (1).

The EXOR circuit 9a-(4k−p, 3) EXOR calculates the parallel inputs $I_{4k-3}$ to $I_{4k-p}$ and the input to the delay circuit 9b-4(k−1), and inputs the EXOR-calculated result to the delay circuit 9b-(4k−p) in the third column. The delay circuit 9b-(4k−p) outputs the one-clock delayed parallel outputs $O_2$, $O_3$, $O_5$, $O_6$, $O_7$, $O_9$, $O_{10}$, $O_{11}$, $O_{13}$, $O_{14}$, and $O_{15}$.

In FIG. 9, an output EXO9a-(2, 3) of the EXOR circuit 9a-(2, 3) in the second row and the third column can be given by $$EXO9a\text{-}(2,3) = II_1 * I_2 \tag{12-1}$$

An output EXO9a-(3, 3) of the EXOR circuit 9a-(3, 3) in the third row and the third column can be given by $$EXO9a\text{-}(3,3) = II_1 * I_2 * I_3 \tag{12-2}$$

An output EXO9a-(5, 3) of the EXOR circuit 9a-(5, 3) in the fifth row and the third column can be given by $$EXO9a\text{-}(5,3) = EXO9a\text{-}(4,1) * I_5 \tag{12-3}$$

An output EXO9a-(6, 3) of the EXOR circuit 9a-(6, 3) in the sixth row and the third column can be given by $$EXO9a\text{-}(6,3) = EXO9a\text{-}(4,1) * I_5 * I_6 \tag{12-4}$$

An output EXO9a-(7, 3) of the EXOR circuit 9a-(7, 3) in the seventh row and the third column can be given by $$EXO9a\text{-}(7,3) = EXO9a\text{-}(4,1) * I_5 * I_6 * I_7 \tag{12-5}$$

An output EXO9a-(9, 3) of the EXOR circuit 9a-(9, 3) in the ninth row and the third column can be given by $$EXO9a\text{-}(9,3) = EXO9a\text{-}(8,2) * I_9 \tag{12-6}$$

An output EXO9a-(10, 3) of the EXOR circuit 9a-(10, 3) in the third row and the third column can be given by $$EXO9a\text{-}(10,3) = EXO9a\text{-}(8,2) * I_9 * I_{10} \quad (12\text{-}7)$$

An output EXO9a-(11, 3) of the EXOR circuit 9a-(11, 3) in the eleventh row and the third column can be given by $$EXO9a\text{-}(10,3) = EXO9a\text{-}(8,2) * I_9 * I_{10} * I_{11} \quad (12\text{-}8)$$

An output EXO9a-(13, 3) of the EXOR circuit 9a-(13, 3) in the thirteenth row and the third column can be given by $$EXO9a\text{-}(13,3) = EXO9a\text{-}(12,2) * I_{13} \quad (12\text{-}9)$$

An output EXO9a-(14, 3) of the EXOR circuit 9a-(14, 3) in the fourteenth row and the third column can be given by $$EXO9a\text{-}(14,3) = EXO9a\text{-}(12,2) * I_{13} * I_{14} \quad (12\text{-}10)$$

An output EXO9a-(15, 3) of the EXOR circuit 9a-(15, 3) in the fifteenth row and the third column can be given by $$EXO9a\text{-}(15,3) = EXO9a\text{-}(12,2) * I_{13} * I_{14} * I_{15} \quad (12\text{-}11)$$

Based on Equations (9) and (11), Equations (12-1) to (12-11) become $$EXO9a - (2, 3) = II_1 * I_2 \quad (13\text{-}1)$$

$$EXO9a - (3, 3) = II_1 * I_2 * I_3 \quad (13\text{-}2)$$

$$EXO9a - (5, 3) = II_1 * I_2 * I_3 * I_4 * I_5 \quad (13\text{-}3)$$

$$EXO9a - (6, 3) = II_1 * I_2 * I_3 * I_4 * I_5 * I_6 \quad (13\text{-}4)$$

$$EXO9a - (7, 3) = II_1 * I_2 * I_3 * I_4 * I_5 * I_6 * I_7 \quad (13\text{-}5)$$

$$EXO9a - (9, 3) = II_1 * I_2 * I_3 * I_4 * I_5 * I_6 * I_7 * I_8 * I_9 \quad (13\text{-}6)$$

$$EXO9a - (10, 3) = II_1 * I_2 * I_3 * I_4 * I_5 * I_6 * I_7 * I_8 * I_9 * I_{10} \quad (13\text{-}7)$$

$$EXO9a - (11, 3) = II_1 * I_2 * I_3 * I_4 * I_5 * I_6 * I_7 * I_8 * I_9 * I_{10} * I_{11} \quad (13\text{-}8)$$

$$EXO9a - (13, 3) = \\ II_1 * I_2 * I_3 * I_4 * I_5 * I_6 * I_7 * I_8 * I_9 * I_{10} * I_{11} * I_{12} * I_{13} \quad (13\text{-}9)$$

$$EXO9a - (14, 3) = \\ II_1 * I_2 * I_3 * I_4 * I_5 * I_6 * I_7 * I_8 * I_9 * I_{10} * I_{11} * I_{12} * I_{13} * I_{14} \quad (13\text{-}10)$$

$$EXO9a - (15, 3) = \\ II_1 * I_2 * I_3 * I_4 * I_5 * I_6 * I_7 * I_8 * I_9 * I_{10} * I_{11} * I_{12} * I_{13} * I_{14} * I_{15} \quad (13\text{-}11)$$

Equations (13-1) to (13-11) are hereinafter also referred to as Equations (13).

As is clear from Equations (9) to (13), the n-bit parallel precoder circuit according to the second embodiment becomes equivalent to the serial precoder circuit. In the second embodiment, a parallel precoder circuit that is developed in a higher bit width can be also obtained by recursively configuring the EXOR circuit, like in the first embodiment. The bit width n for development is not particularly limited to the power of two.

As explained above, according to the second embodiment, the EXOR circuit in the zeroth column executes the EXOR calculation by using the output of the delay circuit in the nth row as one input, and using the parallel input in the first row as the other input. When k is 1, the multiple-input EXOR circuit in the (r×k)th row and the first column executes the EXOR calculation of the output of the EXOR circuit in the zeroth column when the value of k is 1, and the parallel inputs from the second row to the rth row. When k is larger than 1, the EXOR circuit in the (r×k)th row and the first column executes the EXOR calculation of the parallel input from the (r×k−r+1)th row to the (r×k)th row. When r×k−p×r^(m−1) is equal to or larger than 1, the multiple-input EXOR circuit in the (r×k)th row and the mth column executes the EXOR calculation by inputting the output of the multiple-input EXOR circuit in the (r×k−p×r^(m−1))th row and the (m−1)th column from the (r×k−(r−1)×r^(m−1))th row to the (r×k)th row. When no multiple-input EXOR circuit is disposed in the (r×k−p×r^(m−1))th row and the (m−1)th column, the multiple-input EXOR circuit in the (r×k)th row and the mth column executes the EXOR calculation by using as an input the output of the multiple-input EXOR circuit having a largest column number among multiple-input EXOR circuits disposed in the (r×k−p×r^(m−1))th row. The multiple-input EXOR circuit in the (r×k−q)th row and the hth column executes the EXOR calculation by using as inputs the parallel input from the (r×k−1)th row to the (r×k−q)th row and the output of the multiple-input EXOR circuit having a largest column number among multiple-input EXOR circuits disposed in the (r×k−r)th row. The delay circuits in the first to the nth rows delay the output of the EXOR circuit having a largest column number among EXOR circuits disposed in the first to the nth rows respectively, and use the delayed results as the parallel outputs in the first to the nth rows.

In other words, the parallel precoder circuit according to the second embodiment executes the EXOR calculation by dividing data into plural groups, and obtains a result by further executing EXOR calculation at divided stages. Therefore, a parallel precoder having a small circuit delay and having decreased the required operation speed of the EXOR circuits can be obtained.

Specifically, the parallel precoder circuit according to the second embodiment can decrease a maximum delay to $\log_r n + 2$ stages in the r-input EXOR circuits. For example, when n=16, the delay becomes a four-stage delay. When n=64, the delay becomes a five-stage delay. The circuit scale can be decreased to within $n \times \log_r n$ in the gate size of the r-input EXOR circuits.

Furthermore, according to the second embodiment, maximum multiple input r EXOR circuits are used. Therefore, when r-input combination circuit is prepared using a minimum unit primitive element, an internal-logic circuit rewritable chip such as a field programmable gate array (FPGA) uses the r-input cell realizing an optional logical operation, as a minimum unit. Consequently, the circuit scale can be made smaller.

A parallel precoder circuit according to a third embodiment of the present invention is explained below with reference to FIG. 10. The parallel precoder circuit according to the third embodiment calculates parallel outputs $O_1$ to $O_n$ from n ($2 \leq n$, where n is an integer) bit parallel inputs $I_1$ to $I_n$.

The parallel precoder circuit according to the third embodiment includes two-input EXOR circuits 10a (10a-(i, j)), and delay circuits 10b (10b-1 to 10b-n) that consist of flip-flops and that delay input signals by a unit time, and output delayed signals.

In the parallel precoder circuit according to the third embodiment, the EXOR circuits 10a and the delay circuits 10b are connected together in a net configuration as described later, in a similar manner to that according to the first embodiment. In the EXOR circuits 10a-(i, j), the ith row EXOR circuit is an EXOR circuit disposed in a signal path that connects between the parallel input $I_i$ and a delay circuit 7b-i. The jth column EXOR circuit is a jth EXOR circuit from the parallel input $I_i$, by defining that the EXOR circuit that is input with the output of the delay circuit 10b-n and the parallel input $I_i$ is the zeroth column EXOR circuit. When the last column in which the EXOR circuit is disposed is defined as the hth column, the last column h becomes a smallest integer equal to or larger than $\log_2 n$.

Figure 10:
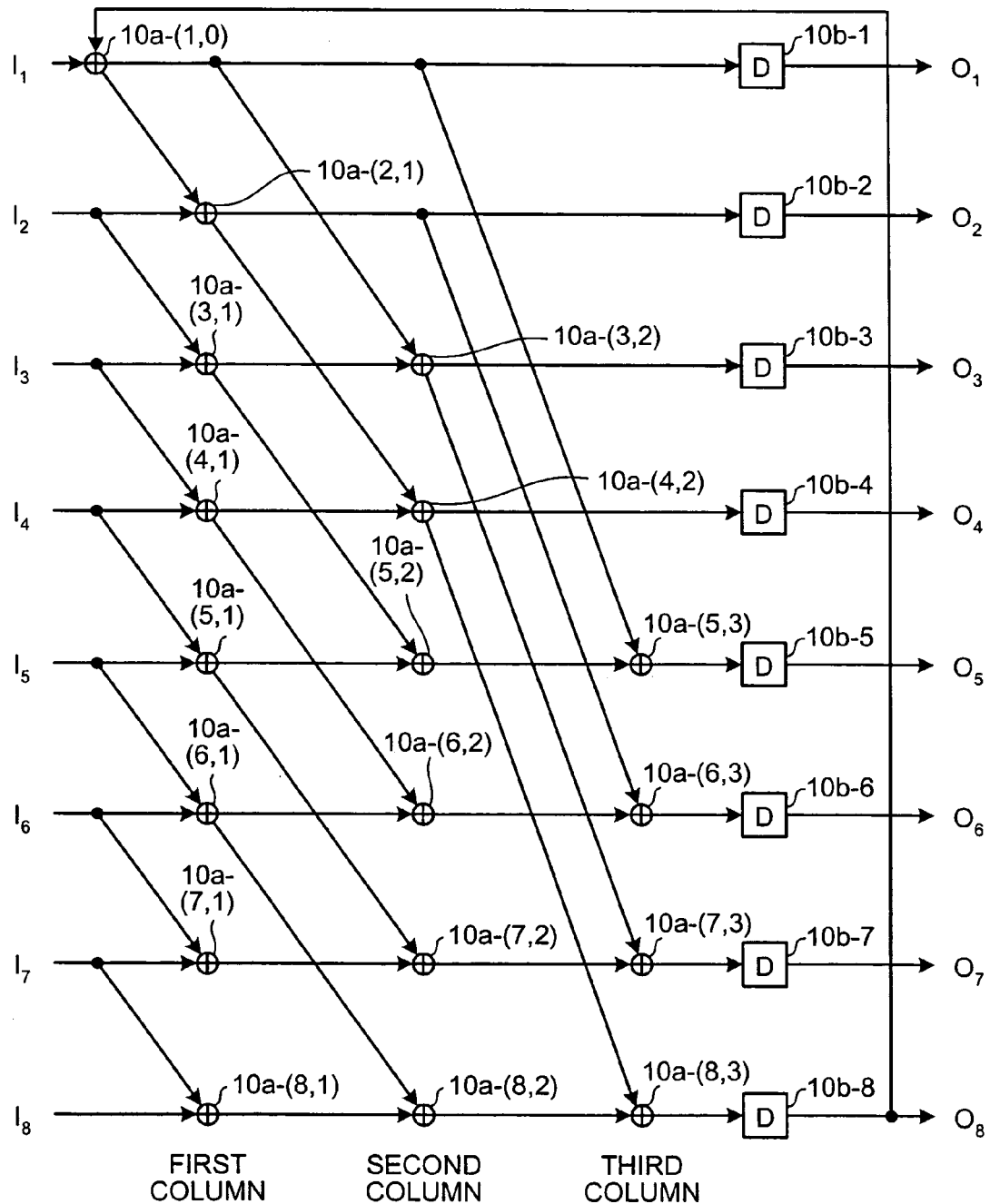
FIG. 10 is a schematic for illustrating an example of a configuration of a parallel-precoder circuit according to a third embodiment of the present invention.

FIG. 10 is a schematic for illustrating an example of a configuration of a parallel precoder circuit according to the third embodiment, where "the number of bits n=8". The parallel precoder circuit includes the EXOR circuit 10a (10a-(1, 0), 10a-(2, 1), 10a-(3, 1), 10a-(4, 1), 10a-(5, 1), 10a-(6, 1), 10a-(7, 1), 10a-(8, 1), 10a-(3, 2), 10a-(4, 2), 10a-(5, 2), 10a-(6, 2), 10a-(7, 2), 10a-(8, 2), 10a-(5, 3), 10a-(6, 3), 10a-(7, 3), and 10a-(8, 3)), and delay circuits (D in FIG. 10) 10b (10b-1 to 10b-8).

The EXOR circuit 10a-(1, 0) is disposed in the first row and the zeroth column, the EXOR circuit 10a-(2, 1) is disposed in the second row and the first column, the EXOR circuit 10a-(3, 1) is disposed in the third row and the first column, the EXOR circuit 10a-(3, 2) is disposed in the third row and the second column, the EXOR circuit 10a-(4, 1) is disposed in the fourth row and the first column, the EXOR circuit 10a-(4, 2) is disposed in the fourth row and the second column, the EXOR circuit 10a-(5, 1) is disposed in the fifth row and the first column, the EXOR circuit 10a-(5, 2) is disposed in the fifth row and the second column, the EXOR circuit 10a-(5, 3) is disposed in the fifth row and the third column, the EXOR circuit 10a-(6, 1) is disposed in the sixth row and the first column, the EXOR circuit 10a-(6, 2) is disposed in the sixth row and the second column, the EXOR circuit 10a-(6, 3) is disposed in the sixth row and the third column, the EXOR circuit 10a-(7, 1) is disposed in the seventh row and the first column, the EXOR circuit 10a-(7, 2) is disposed in the seventh row and the second column, the EXOR circuit 10a-(7, 3) is disposed in the seventh row and the third column, the EXOR circuit 10a-(8, 1) is disposed in the eight row and the first column, the EXOR circuit 10a-(8, 2) is disposed in the eighth row and the first column, and the EXOR circuit 10a-(8, 3) is disposed in the eighth row and the third column. The third column is the last column.

A parallel input $I_k$ is connected to one input and a parallel input $I_{k-1}$ is connected to the other input respectively of the EXOR circuit 10a-(k, 1) in the kth row and the first column. However, instead of the parallel input $I_1$, the output of the EXOR circuit 10a-(1, 0) is connected to the other input of the EXOR circuit 10a-(2, 1) in the second row and the first column. In the above, k is an integer that satisfies "$2 \leq k \leq n$".

The output of the EXOR circuit 10a-(k-2^(m-1), m-1) is connected to one input, and the output of the EXOR circuit 10a-(k, m-1) is connected to the other input respectively of the EXOR circuit 10a-(k, m) in the kth row and the mth column. However, when no EXOR circuit is disposed in the (k-2^(m-1))th row and the (m-1)th column, the output of the EXOR circuit in the jth column having a largest column number j among EXOR circuits disposed in the (k-2^(m-1))th row is connected to the other input of the EXOR circuit 10a-(2k, m). When k-2^(m-1) is smaller than 1, no EXOR circuit is disposed. In the above, m is an integer that satisfies "$2 \leq m \leq h$".

The output of the EXOR circuit in the jth column having a largest column number j among EXOR circuits disposed in the ith row is connected to the input of the delay circuit 10b-i in the ith row. However, the output of the EXOR circuit 10a-(1, 0) is connected to the input of the delay circuit 10b-1 in the first row. The output of the delay circuit 10b-i becomes the parallel output $O_i$.

The EXOR circuit 10-(k, 1) in the first column outputs a result of EXOR calculating the parallel inputs $I_k$ and $I_{k-1}$. The EXOR circuit 10a-(k, 2) in the second column outputs a result of EXOR calculating the outputs of the EXOR circuit 10a-(k-2, 1) and the EXOR circuit 10a-(k, 1). In other words, the output of the EXOR circuit 10a-(k, 2) is equivalent to the result obtained by EXOR calculating the parallel inputs $I_k$ to $I_{k-3}$.

In the 8-bit parallel precoder circuit shown in FIG. 10, when the output of the EXOR circuit 10a-(1, 0) in the first row and the zeroth column is $II_1$ and when the EXOR operator is "*", an output EXO10a-(2, 1) of the EXOR circuit 10a-(2, 1) in the second row and the first column can be given by $$EXO10a\text{-}(2,1) = II_1 * I_2 \qquad (14\text{-}1)$$

An output EXO10a-(3, 1) of the EXOR circuit 10a-(3, 1) in the third row and the first column can be given by $$EXO10a\text{-}(3,1) = I_2 * I_3 \qquad (14\text{-}2)$$

An output EXO10a-(4, 1) of the EXOR circuit 10a-(4, 1) in the fourth row and the first column can be given by $$XO10a\text{-}(4,1) = I_3 * I_4 \qquad (14\text{-}3)$$

An output EXO10a-(5, 1) of the EXOR circuit 10a-(5, 1) in the fifth row and the first column can be given by $$EXO10a\text{-}(5,1) = I_4 * I_5 \qquad (14\text{-}4)$$

An output EXO10a-(6, 1) of the EXOR circuit 10a-(6, 1) in the sixth row and the first column can be given by $$EXO10a\text{-}(6,1) = I_5 * I_6 \qquad (14\text{-}5)$$

An output EXO10a-(7, 1) of the EXOR circuit 10a-(7, 1) in the seventh row and the first column can be given by $$EXO10a\text{-}(7,1) = I_6 * I_7 \qquad (14\text{-}6)$$

An output EXO10a-(8, 1) of the EXOR circuit 10a-(8, 1) in the eighth row and the first column can be given by $$EXO10a\text{-}(8,1) = I_7 * I_8 \qquad (14\text{-}7)$$

Equations (14-1) to (14-7) are hereinafter also referred to as Equations (14).

An output EXO10a-(3, 2) of the EXOR circuit 10a-(3, 2) in the third row and the second column can be given by $$EXO10a\text{-}(3,2) = EXO10a\text{-}(1,0) * EXO10a\text{-}(3,1) \qquad (15\text{-}1)$$

An output EXO10a-(4, 2) of the EXOR circuit 10a-(4, 2) in the fourth row and the second column can be given by $$EXO10a\text{-}(4,2) = EXO10a\text{-}(2,1) * EXO10a\text{-}(4,1) \qquad (15\text{-}2)$$

An output EXO10a-(5, 2) of the EXOR circuit 10a-(5, 2) in the fifth row and the second column can be given by $$EXO10a\text{-}(5,2) = EXO10a\text{-}(3,1) * EXO10a\text{-}(5,1) \qquad (15\text{-}3)$$

An output EXO10a-(6, 2) of the EXOR circuit 10a-(6, 2) in the sixth row and the second column can be given by $$EXO10a\text{-}(6,2) = EXO10a\text{-}(4,1) * EXO10a\text{-}(6,1) \qquad (15\text{-}4)$$

An output EXO10a-(7, 2) of the EXOR circuit 10a-(7, 2) in the seventh row and the second column can be given by $$EXO10a\text{-}(7,2) = EXO10a\text{-}(5,1) * EXO11a\text{-}(7,1) \qquad (15\text{-}5)$$

An output EXO10a-(8, 2) of the EXOR circuit 10a-(8, 2) in the eighth row and the second column can be given by $$EXO10a\text{-}(8,2) = EXO10a\text{-}(6,1) * EXO10a\text{-}(8,1) \qquad (15\text{-}6)$$

Based on Equations (14), Equations (15-1) to (15-6) become $$EXO10a\text{-}(3,2)=I_1*I_2*I_3 \quad (16\text{-}1)$$

$$EXO10a\text{-}(4,2)=I_1*I_2*I_3*I_4 \quad (16\text{-}2)$$

$$EXO10a\text{-}(5,2)=I_2*I_3*I_4*I_5 \quad (16\text{-}3)$$

$$EXO10a\text{-}(6,2)=I_3*I_4*I_5*I_6 \quad (16\text{-}4)$$

$$EXO10a\text{-}(7,2)=I_4*I_5*I_6*I_7 \quad (16\text{-}5)$$

$$EXO10a\text{-}(8,2)=I_5*I_6*I_7*I_8 \quad (16\text{-}6)$$

Equations (16-1) to (16-6) are hereinafter also referred to as Equations (16).

The EXOR circuit $10a\text{-}(k, 3)$ in the third column outputs a result of EXOR calculating the output of the EXOR circuit $10a\text{-}(k, 2)$ and the output of the EXOR circuit $10a\text{-}(k-4, 2)$. The output of the EXOR circuit $10a\text{-}(k, 3)$ is equal to a result of EXOR calculating the parallel inputs $I_k$ to $I_{k-7}$ (corresponding to the output of the EXOR circuit $10a\text{-}(8, 3)$ in FIG. 10). When k−7 is equal to or smaller than 0 (corresponding to the outputs of the EXOR circuit $10a\text{-}(5, 3)$) to $10a\text{-}(7, 3)$ in FIG. 10), the output of the EXOR circuit $10a\text{-}(k, 3)$ is equal to a result of EXOR calculating the parallel inputs $I_k$ to $I_1$.

In FIG. 10, an output $EXO10a\text{-}(5, 3)$ of the EXOR circuit $10a\text{-}(5, 3)$ in the fifth row and the third column can be given by $$EXO10a\text{-}(5,3)=I_1*EXO10a\text{-}(5,2) \quad (17\text{-}1)$$

An output $EXO10a\text{-}(6, 3)$ of the EXOR circuit $10a\text{-}(6, 3)$ in the sixth row and the third column can be given by $$EXO10a\text{-}(6,3)=EXO10a\text{-}(2,1)*EXO10a\text{-}(6,2) \quad (17\text{-}2)$$

An output $EXO10a\text{-}(7, 3)$ of the EXOR circuit $10a\text{-}(7, 3)$ in the seventh row and the third column can be given by $$EXO10a\text{-}(7,3)=EXO10a\text{-}(3,2)*EXO10a\text{-}(7,2) \quad (17\text{-}3)$$

An output $EXO10a\text{-}(8, 3)$ of the EXOR circuit $10a\text{-}(8, 3)$ in the eighth row and the third column can be given by $$EXO10a\text{-}(8,3)=EXO10a\text{-}(4,2)*EXO10a\text{-}(8,2) \quad (17\text{-}4)$$

Based on, Equations (14) and (16), Equations (17-1) to (17-4) become $$EXO10a\text{-}(5,3)=I_1*I_2*I_3*I_4*I_5 \quad (18\text{-}1)$$

$$EXO10a\text{-}(6,3)=I_1*I_2*I_3*I_4*I_5*I_6 \quad (18\text{-}2)$$

$$EXO10a\text{-}(7,3)=I_1*I_2*I_3*I_4*I_5*I_6*I_7 \quad (18\text{-}3)$$

$$EXO10a\text{-}(8,3)=I_1*I_2*I_3*I_4*I_5*I_6*I_7*I_8 \quad (18\text{-}4)$$

Equations (18-1) to (18-4) are hereinafter also referred to as Equations (18).

Equations (14), (16), and (18) are obtained by EXOR calculating the parallel output $O_8$ one clock before, and all the parallel inputs $I_1$ to $I_8$ that are positioned before in time series in the parallel inputs $I_1$ to $I_8$. These Equations (14), (16), and (18) satisfy Equation (1). In other words, the n-bit parallel precoder circuit according to the third embodiment is equivalent to the serial precoder circuit. The bit width n for parallel development is not particularly limited to the power of two.

As explained above, according to the third embodiment, the EXOR circuit in the zeroth column executes the EXOR calculation by using the output of the delay circuit in the nth row as one input, and using the parallel input in the first row as the other input. The EXOR circuit in the kth row and the first column executes the EXOR calculation by using the parallel input in the kth row as one input, and using the output of the EXOR circuit in the zeroth column as the other input when the value of k is 2, or using the parallel signal in the (k−1)ith row as the other input when the value of k is larger than 2. The EXOR circuit in the kth row and the mth column executes the EXOR calculation by using the output of the EXOR circuit in the kth row and the (m−1)th column, and the output of the EXOR circuit in the (k−2^(m−1))th row and the (m−1)-column as inputs, when k−2^(m−1) is equal to or larger than 1. When no EXOR circuit is disposed in the (k−2^(m−1))th row and the (m−1)th column, the EXOR circuit in the kth row and the mth column executes the EXOR calculation by using as inputs the output of the EXOR circuit in the kth row and the (m−1)th column, and the output of the EXOR circuit having a largest column number among EXOR circuits disposed in the (k−2^(m−1))th row. The delay circuits in the first to the nth rows delay the output of the EXOR circuit having a largest column number among EXOR circuits disposed in the first to the nth rows respectively, and use the delayed results as the parallel outputs in the first to the nth rows.

In other words, the parallel precoder circuit according to the third embodiment executes the EXOR calculation by dividing data into plural groups, and obtains a result by further executing EXOR calculation at divided stages. Therefore, a parallel precoder having a small circuit delay can be obtained. Specifically, in the third embodiment, a maximum delay can be decreased to $\log_2 n+1$ stages. Furthermore, a circuit scale can be decreased to within $n \times \log_2 n$.

A parallel precoder circuit according to a fourth embodiment of the present invention is explained below with reference to FIG. 11. The parallel precoder circuit according to the fourth embodiment calculates parallel outputs $O_1$ to $O_n$ from n (2≦n, where n is an integer) bit parallel inputs $I_1$ to $I_n$.

The parallel precoder circuit according to the fourth embodiment includes EXOR circuits $11a$ ($11a$-(i, j)) having different number of inputs, and delay circuits $11b$ ($11b$-1 to $11b$-n) that consist of flip-flops and that delay input signals by a unit time, and output delayed signals. The configuration of the multiple-input EXOR circuits is the same as that of the multiple-input EXOR circuits according to the second embodiment, and therefore, the explanation of the configuration is omitted.

In the parallel precoder circuit according to the fourth embodiment, the EXOR circuits $11a$ and the delay circuits $11b$ are connected together in a net configuration as described later, in a similar manner to that according to the first embodiment. In the fourth embodiment, when a maximum number of inputs of the multiple-input EXOR circuits is expressed as r, a last column h becomes a smallest integer equal to or above $\log_r n$.

Figure 11:
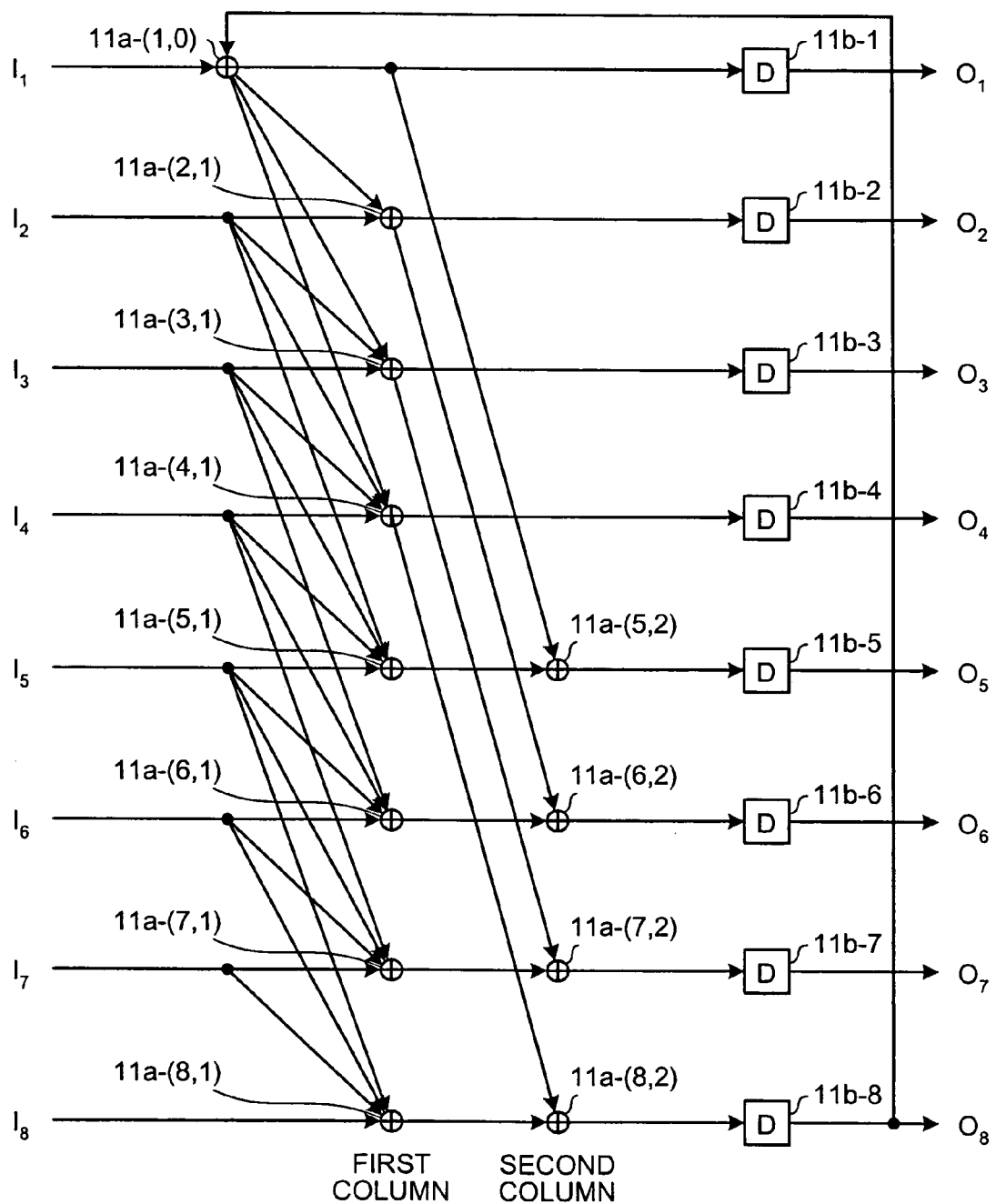
FIG. 11 is a schematic for illustrating an example of a configuration of a parallel precoder circuit according to a fourth embodiment of the present invention.

FIG. 11 is a schematic for illustrating an example of a configuration of a parallel precoder circuit according to the fourth embodiment, where "the number of bits n=8" and "the maximum number of inputs r=4". The parallel precoder circuit includes the EXOR circuit $11a$ ($11a$-(1, 0), $11a$-(2, 1), $11a$-(3, 1), $11a$-(4, 1), $11a$-(5, 1), $11a$-(6, 1), $11a$-(7, 1), $11a$-(8, 1), $11a$-(5, 2), $11a$-(6, 2), $11a$-(7, 2), and $11a$-(8, 2)), and delay circuits (D in FIG. 11) $11$-$b$ ($11b$-1 to $11b$-8).

The EXOR circuit $11a$-(1, 0) is a two-input EXOR circuit disposed in the first row and the zeroth column, the EXOR circuit $11a$-(2, 1) is a two-input EXOR circuit disposed in the second row and the first column, the EXOR circuit $11a$-(3, 1) is a three-input EXOR circuit disposed in the third row and the first column, the EXOR circuit $11a$-(4, 1) is an r-input (4-input, in this case) EXOR circuit disposed in the fourth row and the first column, the EXOR circuit 11a-(5, 1) is a fourth-input EXOR circuit disposed in the fifth row and the first column, the EXOR circuit 11a-(6, 1) is a four-input EXOR circuit disposed in the sixth row and the first column, the EXOR circuit 11a-(7, 1) is a four-input EXOR circuit disposed in the seventh row and the first column, the EXOR circuit 11a-(8, 1) is a four-input EXOR circuit disposed in the eighth row and the first column, the EXOR circuit 11a-(5, 2) is a two-input EXOR circuit disposed in the fifth row and the second column, the EXOR circuit 11a-(6, 2) is a two-input EXOR circuit disposed in the sixth row and the second column, the EXOR circuit 11a-(7, 2) is a two-input EXOR circuit disposed in the seventh row and the second column, and the EXOR circuit 11a-(8, 2) is a two-input EXOR circuit disposed in the eighth row and the second column. The second column becomes the last column.

A parallel input $I_k$, a parallel input $I_{k-1}$, a parallel input $I_{k-2}, \ldots$, and a parallel input $I_{k-r+1}$ are connected to the input of the EXOR circuit 11a-(k, 1) in the kth row and the first column. However, when k−r+1 is smaller than 1, these parallel inputs are not connected to the multiple inputs of the EXOR circuits 11a-(k, 1). Instead of the parallel input $I_1$, the output of the EXOR circuit 11a-(1, 0) is connected to the multiple inputs of the EXOR circuits 11a-(k, 1). In the above, k is an integer that satisfies "$2 \leq k \leq n$".

The output of the EXOR circuit 11a-(1, 0) and the parallel input $I_2$ are connected to the EXOR circuit 11a-(2, 1). The output of the EXOR circuit 11a-(1, 0) and the parallel inputs $I_2$ and $I_3$ are connected to the EXOR circuit 11a-(3, 1). The output of the EXOR circuit 11a-(1, 0) and the parallel inputs $I_2$ to $I_4$ are connected to the EXOR circuit 11a-(4, 1). The parallel inputs $I_2$ to $I_5$ are connected to the EXOR circuit 11a-(5, 1). The parallel inputs $I_3$ to $I_6$ are connected to the EXOR circuit 11a-(6, 1). The parallel inputs $I_4$ to $I_7$ are connected to the EXOR circuit 11a-(7, 1). The parallel inputs $I_5$ to $I_8$ are connected to the EXOR circuit 11a-(8, 1).

The outputs of the EXOR circuit 11a-(k−(r−1)×r^(m−1), m−1), . . . , the EXOR circuit 11a-(k−p×r−^(m−1), m−1), . . . , and the EXOR circuit 11a-(k−, m−1) are connected to the input of the EXOR circuit 11a-(k, m) in the kth row and the mth column. However, when no EXOR circuit is disposed in the (k−p×r^(m−1))th row and the (m−1)th column, the output of the EXOR circuit in the jth row having a largest column number j among EXOR circuits that are present in the (k−p×r^(m−1))th row is connected to the input of the EXOR circuit 11a-(r×k, m). When k−p×r^(m−1) is smaller than "1", one of the inputs of the multiple-input EXOR circuits 11a-(k, m) is kept blank. When the input is only one output of the EXOR circuit 11a-(k, m−1), no EXOR circuit is disposed. In the above, m is an integer that satisfies "$2 \leq m \leq h-1$", and p is an integer that satisfies "$0 \leq p \leq r-1$".

The output of the EXOR circuit 11a-(1, 0) and the output of the EXOR circuit 11a-(5, 1) are connected to the input of the EXOR circuit 11a-(5, 2). The output of the EXOR circuit 11a-(3, 1) and the output of the EXOR circuit 11a-(7, 1) are connected to the input of the EXOR circuit 11a-(7, 2). The output of the EXOR circuit 11a-(4, 0) and the output of the EXOR circuit 11a-(8, 1) are connected to the input of the EXOR circuit 11a-(8, 2).

The output of the EXOR circuit in the jth column having a largest column number j among EXOR circuits disposed in the kth row is connected to the input of the delay circuit 11b-k in the kth row. However, the output of the EXOR circuit 11a-(1, 0) is connected to the input of the delay circuit 11b-1 in the first row. The output of the delay circuit 11b-i becomes the parallel output $O_i$.

The EXOR circuit 11a-(k, 1) in the first column outputs a result of EXOR calculating the parallel inputs $I_{k-r+1}$ to $I_k$. The EXOR circuit 11a-(k, 2) in the second column outputs a result of EXOR calculating the output of the EXOR circuits 11a-(k−p×r, 1) to 11a-(k, 1). In other words, the output of the EXOR circuit 11a-(k, 2) is equivalent to the result obtained by EXOR calculating the parallel inputs $I_{k-r}\times_{r+1}$ to $I_k$.

In the 8-bit parallel precoder circuit shown in FIG. 11, when the output of the EXOR circuit 11a-(1, 0) in the first row and the zeroth column is $II_1$ and when the EXOR operator is "*", an output EXO11a-(2, 1) of the EXOR circuit 11a-(2, 1) in the second row and the first column can be given by $$EXO11a\text{-}(2,1) = II_1 * I_2 \tag{19-1}$$

An output EXO11a-(3, 1) of the EXOR circuit 11a-(3, 1) in the third row and the first column can be given by $$EXO11a\text{-}(3,1) = II_1 * I_2 * I_3 \tag{19-2}$$

An output EXO11a-(4, 1) of the EXOR circuit 11a-(4, 1) in the fourth row and the first column can be given by $$EXO11a\text{-}(4,1) = II_1 * I_2 * I_3 * I_4 \tag{19-3}$$

An output EXO11a-(5, 1) of the EXOR circuit 11a-(5, 1) in the fifth row and the first column can be given by $$EXO11a\text{-}(5,1) = I_2 * I_3 * I_4 * I_5 \tag{19-4}$$

An output EXO11a-(6, 1) of the EXOR circuit 11a-(6, 1) in the sixth row and the first column can be given by $$EXO11a\text{-}(6,1) = I_3 * I_4 * I_5 * I_6 \tag{19-5}$$

An output EXO11a-(7, 1) of the EXOR circuit 11a-(7, 1) in the seventh row and the first column can be given by $$EXO11a\text{-}(7,1) = I_4 * I_5 * I_6 * I_7 \tag{19-6}$$

An output EXO11a-(8, 1) of the EXOR circuit 11a-(8, 1) in the eighth row and the first column can be given by $$EXO11a\text{-}(8,1) = I_5 * I_6 * I_7 * I_8 \tag{19-7}$$

Equation (19-1) to (19-7) are hereinafter also referred to as Equations (19).

An output EXO11a-(5, 2) of the EXOR circuit 11a-(5, 2) in the fifth row and the second column can be given by $$EXO11a\text{-}(5,2) = II_1 * EXO11a\text{-}(5,1) \tag{20-1}$$

An output EXO11a-(6, 2) of the EXOR circuit 11a-(6, 2) in the sixth row and the second column can be given by $$EXO11a\text{-}(6,2) = EXO11a\text{-}(2,1) * EXO11a\text{-}(6,1) \tag{20-2}$$

An output EXO11a-(7, 2) of the EXOR circuit 11a-(7, 2) in the seventh row and the second column can be given by $$EXO11a\text{-}(7,2) = EXO11a\text{-}(3,1) * EXO11a\text{-}(7,1) \tag{20-3}$$

An output EXO11a-(8, 2) of the EXOR circuit 11a-(8, 2) in the eighth row and the second column can be given by $$EXO11a\text{-}(8,2) = EXO11a\text{-}(4,1) * EXO11a\text{-}(8,1) \tag{20-4}$$

Based on Equations (19), Equation (20-1) to (20-4) become $$EXO11a\text{-}(5,2) = II_1 * I_2 * I_3 * I_4 * I_5 \tag{21-1}$$

$$EXO11a\text{-}(6,2) = II_1 * I_2 * I_3 * I_4 * I_5 * I_6 \tag{21-2}$$

$$EXO11a\text{-}(7,2) = II_1 * I_2 * I_3 * I_4 * I_5 * I_6 * I_7 \tag{21-3}$$

$$EXO11a\text{-}(8,2) = II_1 * I_2 * I_3 * I_4 * I_5 * I_6 * I_7 * I_8 \tag{21-4}$$

Equations (21-1) to (21-4) are hereinafter also referred to as Equations (21).

As is clear from the parallel outputs one clock before in Equations (19) and (20), the n-bit parallel precoder circuit according to the fourth embodiment is equivalent to the serial precoder circuit. Equations (19) and (20) are obtained by EXOR calculating the parallel output $O_8$, and all the parallel inputs $I_1$ to $I_8$ that are positioned before in time series in the parallel inputs $I_1$ to $I_8$. These Equations (19) and (20) satisfy Equation (1). In other words, the n-bit parallel precoder circuit according to the fourth embodiment is equivalent to the serial precoder circuit. The bit width n for parallel development is not particularly limited to the power of two.

As explained above, according to the fourth embodiment, the multiple-input EXOR circuits have a maximum number of inputs r ($2 \leq r$, where r is an integer). The EXOR circuit in the zeroth column executes the EXOR calculation by using the output of the delay circuit in the nth row as one input, and using the parallel input in the first row as the other input. When k−q is 1, the EXOR circuit in the kth row and the first column executes the EXOR calculation by using as inputs the output of the EXOR circuit in the zeroth column and the parallel inputs in the (k−q)th row from the second row to the kth row. When k−q is larger than 1, the EXOR circuit in the kth row and the first column executes the EXOR calculation by using as inputs the parallel inputs in the (k−q)th row from the (k−r+1)th row to the kth row. When k−p×r^(m−1) is equal to or larger than 1, the multiple-input EXOR circuit in the kth row and the mth column executes the EXOR calculation using the output of the multiple-input EXOR circuit in the (k−p×r^(m−1))th row and the (m−1)th column from the (k−(r−1)×r^(m−1))th row to the kth row. When multiple-input EXOR circuits are not disposed in the (k−p×r^(m−1))th row and the (m−1)th column, the multiple-input EXOR circuit in the kth row and the mth column executes the EXOR calculation by using as an input the output of the multiple-input EXOR circuit having a largest column number among multiple-input EXOR circuits disposed in the (k−p×r^(m−1))th row. The delay circuits in the first to the nth rows delay the output of the EXOR circuit having a largest column number among EXOR circuits disposed in the first to the nth rows respectively, and use the delayed results as the parallel outputs in the first to the nth-rows.

In other words, the parallel precoder circuit according to the fourth embodiment executes the EXOR calculation by dividing data into plural groups, and obtains a result by further executing EXOR calculation at divided stages. Therefore, a parallel precoder having a small circuit delay can be obtained. Specifically, in the fourth embodiment, a maximum delay can be decreased to $\log_r n$ stages. Furthermore, a circuit scale can be decreased to within $n \times \log_r n$.

A parallel precoder circuit according to a fifth embodiment of the present invention is explained below with reference to FIG. 12. The parallel precoder circuit according to the fifth embodiment calculates parallel outputs $O_1$ to $O_n$ from n ($2 \leq n$, where n is an integer) bit parallel inputs $I_1$ to $I_n$.

The parallel precoder circuit according to the fifth embodiment includes two-input EXOR circuits 12a (12a-(i, j)), and delay circuits 12b (12b-1 to 12b-n) that consist of flip-flops and that delay input signals by a unit time, and output delayed signals.

In the parallel precoder circuit according to the fifth embodiment, the EXOR circuits 12a and the delay circuits 12b are connected together in a net configuration as described later, in a similar manner to that according to the first embodiment. The ith row EXOR circuit is an EXOR circuit disposed in a signal path that connects between a parallel input $I_i$ and a delay circuit 12b-i. The EXOR circuit that is input with the output of the delay circuit 12b-n and the parallel input $I_1$ is defined as the zeroth column EXOR circuit. The jth EXOR circuit from the parallel input $I_i$ is the jth column EXOR circuit. A last column in which the EXOR circuit is disposed is defined as the hth column. When hh is a smallest integer equal to or above $\log_2 n$, the last column becomes an integer that satisfies "h=2×hh−1".

Figure 12:
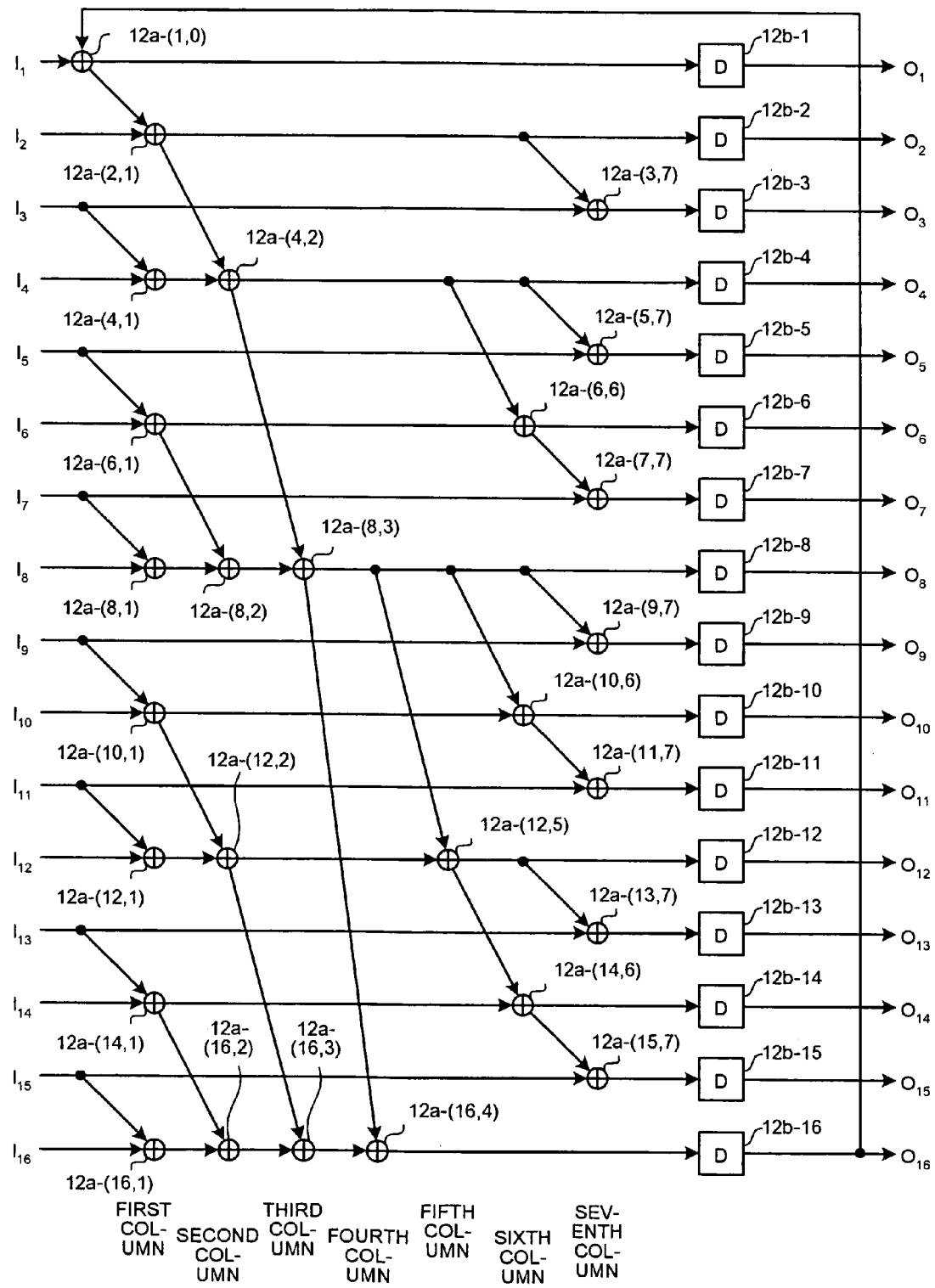
FIG. 12 is a schematic for illustrating an example of a configuration of a parallel precoder circuit according to a fifth embodiment of the present invention.

FIG. 12 is a schematic for illustrating an example of a configuration of a parallel precoder circuit according to the fifth embodiment, where "the number of bits n=16". The parallel precoder circuit includes EXOR circuits 12a (12a-(1, 0), 12a-(2, 1), 12a-(4, 1), 12a-(6, 1), 12a-(8, 1), 12a-(10, 1), 12a-(12, 1), 12a-(14, 1), 12a-(16, 1), 12a-(4, 2), 12a-(8, 2), 12a-(12, 2), 12a-(16, 1), 12a-(8, 3), 12a-(16, 3), 12a-(16, 4), 12a-(12, 5), 12a-(6, 6), 12a-(10, 6), 12a-(14, 6), 12a-(3, 7), 12a-(5, 7), 12a-(7, 7), 12a-(9, 7), 12a-(11, 7), 12a-(13, 7), and 12a-(15, 7)), and delay circuits (D in FIG. 12) 12b (12b-1 to 12b-16).

The EXOR circuit 12a-(1, 0) is disposed in the first row and the zeroth column, the EXOR circuit 12a-(2, 1) is disposed in the second row and the first column, the EXOR circuit 12a-(3, 7) is disposed in the third row and the seventh column, the EXOR circuit 12a-(4, 1) is disposed in the fourth row and the first column, the EXOR circuit 12a-(4, 2) is disposed in the fourth row and the second column, the EXOR circuit 12a-(5, 7) is disposed in the fifth row and the seventh column, the EXOR circuit 12a-(6, 1) is disposed in the sixth row and the first column, the EXOR circuit 12a-(6, 6) is disposed in the sixth row and the sixth column, the EXOR circuit 12a-(7, 7) is disposed in the seventh row and the seventh column, the EXOR circuit 12a-(8, 1) is disposed in the eighth row and the first column, the EXOR circuit 12a-(8, 2) is disposed in the eighth row and the second column, the EXOR circuit 12a-(8, 3) is disposed in the eighth row and the third column, the EXOR circuit 12a-(9, 7) is disposed in the ninth row and the seventh column, the EXOR circuit 12a-(10, 1) is disposed in the tenth row and the first column, the EXOR circuit 12a-(10, 6) is disposed in the tenth row and the sixth column, the EXOR circuit 12a-(11, 7) is disposed in the eleventh row and the seventh column, the EXOR circuit 12a-(12, 1) is disposed in the twelfth row and the first column, the EXOR circuit 12a-(12, 2) is disposed in the twelfth row and the second column, the EXOR circuit 12a-(12, 5) is disposed in the twelfth row and the fifth column, the EXOR circuit 12a-(13, 7) is disposed in the thirteenth row and the seventh column, the EXOR circuit 12a-(14, 1) is disposed in the fourteenth row and the first column, the EXOR circuit 12a-(14, 6) is disposed in the fourteenth row and the sixth column, the EXOR circuit 12a-(15, 7) is disposed in the fifteenth row and the seventh column, the EXOR circuit 12a-(16, 1) is disposed in the sixteenth row and the first column, the EXOR circuit 12a-(16, 2) is disposed in the sixteenth row and the second column, the EXOR circuit 12a-(16, 3) is disposed in the sixteenth row and the third column, and the EXOR circuit 12a-(16, 4) is disposed in the sixteenth row and the fourth column. The seventh column is the last column.

A parallel input $I_{2k}$ is connected to one input and a parallel input $I_{2k-1}$ is connected to the other input respectively of the EXOR circuit 12a-(2k, 1) is the second row and the first column. However, instead of the parallel input $I_1$, the output of the EXOR circuit 12a-(1, 0) is connected to the other input of the EXOR circuit 12a-(2, 1) in the second row and the first column. In the above, k is an integer that satisfies "$1 \leq k \leq n/2$".

The output of the EXOR circuit 12a-((2m)×k−2^(m−1), m−1) is connected to one input, and the output of the EXOR circuit $12a\text{-}((2^\wedge m)\times k, m-1)$ is connected to the other input respectively of the EXOR circuit $12a\text{-}((2^\wedge m)\times k, m)$ in the $((2^\wedge m)\times k)$th row and the mth column. However, when no EXOR circuit is disposed in the $((2^\wedge m)\times k - 2^\wedge(m-1))$th row and the (m−1)th column, no output is connected. For example, in FIG. 12, the output of the EXOR circuit $12a\text{-}(4, 2)$ is connected to one input, and the output of the EXOR circuit $12a\text{-}(8, 2)$ is connected to the other input respectively of the EXOR circuit $12a\text{-}(8, 3)$ when k=1 and m=3. In the above, m is an integer that satisfies "$2 \leq m \leq hh$". In FIG. 12, hh is "4".

Outputs are connected to the EXOR circuit in the mth column when m is in the relationship of $hh+1 \leq m \leq 2 \times hh-1$. The output of the EXOR circuit in the jth column having a largest column number j among EXOR circuits disposed in the $(2^\wedge hh-(2kk-1)\times 2^\wedge(2hh-m-1), m))$th row is connected to one input of the EXOR circuit $12a\text{-}(2^\wedge hh-(2kk-1)\times 2^\wedge(2hh-m-1), m)$ in the $12a\text{-}(2^\wedge hh-(2kk-1)\times 2^\wedge(2hh-m-1), m))$th row and the mth column. The output of the EXOR circuit in the jth column having a largest column number j among EXOR circuits disposed in the $(2^\wedge hh-(2kk-1)\times 2^\wedge(2hh-m-1), m))$th row is connected to the other input of the EXOR circuit $12a\text{-}(2^\wedge hh-(2kk-1)\times 2^\wedge(2hh-m-1), m)$ in the $12a\text{-}(2^\wedge hh-(2kk-1)\times 2^\wedge(2hh-m-1), m))$th row and the mth column. In the above, kk is an integer that satisfies "$1 \leq kk \leq 2^\wedge(m-hh)-1$". For example, in FIG. 12, the output of the EXOR circuit $12a\text{-}(12, 5)$ is connected to one input, and the output of the EXOR circuit $12a\text{-}(14, 1)$ is connected to the other input respectively of the EXOR circuit $12a\text{-}(14, 6)$ when kk=1 and m=6.

The output of the EXOR circuit in the jth column having a largest column number j among EXOR circuits disposed in the ith row is connected to the input of the delay circuit $12b\text{-}i$ in the ith row. However, the output of the EXOR circuit $12a\text{-}(1, 0)$ is connected to the input of the delay circuit $12b\text{-}1$ in the first row. The output of the delay circuit $12b\text{-}i$ becomes the parallel output $O_i$.

The outputs of the EXOR circuits disposed in each row up to the hhth column are explained. When the output of the EXOR circuit $12a\text{-}(1, 0)$ in the first row and the zeroth column is $II_1$ and when the EXOR operator is "*", an output $EXO12a\text{-}(2, 1)$ of the EXOR circuit $12a\text{-}(2, 1)$ in the second row and the first column can be given by $$EXO12a\text{-}(2,1) = II_1 * I_2 \tag{22-1}$$

An output $EXO12a\text{-}(4, 1)$ of the EXOR circuit $12a\text{-}(4, 1)$ in the fourth row and the first column can be given by $$EXO12a\text{-}(4,1) = I_3 * I_4 \tag{22-2}$$

An output $EXO12a\text{-}(6, 1)$ of the EXOR circuit $12a\text{-}(6, 1)$ in the sixth row and the first column can be given by $$EXO12a\text{-}(6,1) = I_5 * I_6 \tag{22-3}$$

An output $EXO12a\text{-}(8, 1)$ of the EXOR circuit $12a\text{-}(8, 1)$ in the eighth row and the first column can be given by $$EXO12a\text{-}(8,1) = I_7 * I_8 \tag{22-4}$$

An output $EXO12a\text{-}(10, 1)$ of the EXOR circuit $12a\text{-}(10, 1)$ in the tenth row and the first column can be given by $$EXO12a\text{-}(10,1) = I_9 * I_{10} \tag{22-5}$$

An output $EXO12a\text{-}(12, 1)$ of the EXOR circuit $12a\text{-}(12, 1)$ in the twelfth row and the first column can be given by $$EXO12a\text{-}(12,1) = I_{11} * I_{12} \tag{22-6}$$

An output $EXO12a\text{-}(14, 1)$ of the EXOR circuit $12a\text{-}(14, 1)$ in the fourteenth row and the first column can be given by $$EXO12a\text{-}(14,1) = I_{13} * I_{14} \tag{22-7}$$

An output $EXO12a\text{-}(16, 1)$ of the EXOR circuit $12a\text{-}(16, 1)$ in the sixteenth row and the first column can be given by $$EXO12a\text{-}(16,1) = I_{15} * I_{16} \tag{22-8}$$

Equations (22-1) to (22-8) are hereinafter also referred to as Equations (22).

An output $EXO12a\text{-}(4, 2)$ of the EXOR circuit $12a\text{-}(4, 2)$ in the fourth row and the second column can be given by $$EXO12a\text{-}(4,2) = EXO12a\text{-}(2,1) * EXO12a\text{-}(4,1) \tag{23-1}$$

An output $EXO12a\text{-}(8, 2)$ of the EXOR circuit $12a\text{-}(8, 2)$ in the eighth row and the second column can be given by $$EXO12a\text{-}(8,2) = EXO12a\text{-}(6,1) * EXO12a\text{-}(8,1) \tag{23-2}$$

An output $EXO12a\text{-}(12, 2)$ of the EXOR circuit $12a\text{-}(12, 2)$ in the twelfth row and the second column can be given by $$EXO12a\text{-}(12,2) = EXO12a\text{-}(10,1) * EXO12a\text{-}(12,1) \tag{23-3}$$

An output $EXO12a\text{-}(16, 2)$ of the EXOR circuit $12a\text{-}(16, 2)$ in the sixteenth row and the second column can be given by $$EXO12a\text{-}(16,2) = EXO12a\text{-}(14,1) * EXO12a\text{-}(16,1) \tag{23-4}$$

Based on Equations (22), Equation (23-1) to (23-4) become $$EXO12a\text{-}(4,2) = II_1 * I_2 * I_3 * I_4 \tag{24-1}$$

$$EXO12a\text{-}(8,2) = I_5 * I_6 * I_7 * I_8 \tag{24-2}$$

$$EXO12a\text{-}(12,2) = I_9 * I_{10} * I_{11} * I_{12} \tag{24-3}$$

$$EXO12a\text{-}(16,2) = I_{13} * I_{14} * I_{15} * I_{16} \tag{24-4}$$

Equations (24-1) to (24-4) are hereinafter also referred to as Equations (24).

An output $EXO12a\text{-}(8, 3)$ of the EXOR circuit $12a\text{-}(8, 3)$ in the eighth row and the third column can be given by $$EXO12a\text{-}(8,3) = EXO12a\text{-}(4,2) * EXO12a\text{-}(8,2) \tag{25-1}$$

An output $EXO12a\text{-}(16, 3)$ of the EXOR circuit $12a\text{-}(16, 3)$ in the sixteenth row and the third column can be given by $$EXO12a\text{-}(16,3) = EXO12a\text{-}(12,2) * EXO12a\text{-}(16,2) \tag{25-2}$$

Based on Equations (24), Equations (25-1) and (25-2) become $$EXO12a\text{-}(8,3) = II_1 * I_2 * I_3 * I_4 * I_5 * I_6 * I_7 * I_8 \tag{26-1}$$

$$EXO12a\text{-}(16,3) = I_9 * I_{10} * I_{11} * I_{12} * I_{13} * I_{14} * I_{15} * I_{16} \tag{26-2}$$

Equations (26-1) and (26-2) are hereinafter also referred to as Equations (26).

An output $EXO12a\text{-}(16, 4)$ of the EXOR circuit $12a\text{-}(16, 4)$ in the sixteenth row and the fourth column can be expressed as $EXO12a\text{-}(16, 4) = EXO12a\text{-}(8, 3) * EXO12a\text{-}(16, 3)$, and this becomes $$EXO12a-(16, 4) = \qquad (27)$$
$$II_1 * I_2 * I_3 * I_4 * I_5 * I_6 * I_7 * I_8 * I_9 * I_{10} * I_{11} * I_{12} * I_{13} * I_{14} * I_{15} * I_{16}$$

based on Equations (26).

An output EXO12a-(12, 5) of the EXOR circuit 12a-(12, 5) in the twelfth row and the fifth column can be expressed as EXO12a-(12, 5)=EXO12a-(8, 3)*EXO12a-(12, 2), and this becomes $$EXO12a\text{-}(12,5) \\ =II_1*I_2*I_3*I_4*I_5*I_6*I_7*I_8*I_9*I_{10}*I_{11}*I_{12} \qquad (28)$$

based on Equations (24) and (26).

An output EXO12a-(6, 6) of the EXOR circuit 12a-(6, 6) in the sixth row and the sixth column can be given by $$EXO12a\text{-}(6,6)=EXO12a\text{-}(4,2)*EXO12a\text{-}(6,1) \qquad (29\text{-}1)$$

An output EXO12a-(16, 6) of the EXOR circuit 12a-(16, 6) in the sixteenth row and the sixth column can be given by $$EXO12a\text{-}(10,6)=EXO12a\text{-}(8,3)*EXO12a\text{-}(10,1) \qquad (29\text{-}2)$$

An output EXO12a-(14, 6) of the EXOR circuit 12a-(14, 6) in the fourteenth row and the sixth column can be given by $$EXO12a\text{-}(14,6)=EXO12a\text{-}(12,5)*EXO12a\text{-}(14,1) \qquad (29\text{-}3)$$

Based on Equations (22), (24), and (26), Equations (29-1) to (29-3) become $$EXO12a\text{-}(6,6)=II_1*I_2*I_3*I_4*I_5*I_6 \qquad (30\text{-}1)$$

$$EXO12a\text{-}(10,6)=II_1*I_2*I_3*I_4*I_5*I_6*I_7*I_8*I_9*I_{10} \qquad (30\text{-}2)$$

$$EXO12a\text{-}(14,6) \\ =II_1*I_2*I_3*I_4*I_5*I_6*I_7*I_8*I_9*I_{10}*I_{11}*I_{12}*I_{13}*I_{14} \qquad (30\text{-}3)$$

Equations (30-1) to (30-3) are hereinafter also referred to as Equations (30).

An output EXO12a-(3, 7) of the EXOR circuit 12a-(3, 7) in the third row and the seventh column can be given by $$EXO12a\text{-}(3,7)=EXO12a\text{-}(2,1)*I_3 \qquad (31\text{-}1)$$

An output EXO12a-(5, 7) of the EXOR circuit 12a-(5, 7) in the fifth row and the seventh column can be given by $$EXO12a\text{-}(5,7)=EXO12a\text{-}(4,2)*I_5 \qquad (31\text{-}2)$$

An output EXO12a-(7, 7) of the EXOR circuit 12a-(7, 7) in the seventh row and the seventh column can be given by $$EXO12a\text{-}(7,7)=EXO12a\text{-}(6,6)*I_7 \qquad (31\text{-}3)$$

An output EXO12a-(9, 7) of the EXOR circuit 12a-(9, 7) in the ninth row and the seventh column can be given by $$EXO12a\text{-}(9,7)=EXO12a\text{-}(8,3)*I_9 \qquad (31\text{-}4)$$

An output EXO12a-(11, 7) of the EXOR circuit 12a-(11, 7) in the eleventh row and the seventh column can be given by $$EXO12a\text{-}(11,7)=EXO12a\text{-}(10,6)*I_{11} \qquad (31\text{-}5)$$

An output EXO12a-(13, 7) of the EXOR circuit 12a-(13, 7) in the thirteenth row and the seventh column can be given by $$EXO12a\text{-}(13,7)=EXO12a\text{-}(12,5)*I_{13} \qquad (31\text{-}6)$$

An output EXO12a-(15, 7) of the EXOR circuit 12a-(15, 7) in the fifteenth row and the seventh column can be given by $$EXO12a\text{-}(15,7)=EXO12a\text{-}(14,6)*I_{15} \qquad (31\text{-}7)$$

Based on Equations (22), Equations (24), (26), (28), (30), and (31-1) to (31-7) become $$EXO12a-(3, 7) = II_1 * I_2 * I_3 \qquad (32\text{-}1)$$

$$EXO12a-(5, 7) = II_1 * I_2 * I_3 * I_4 * I_5 \qquad (32\text{-}2)$$

$$EXO12a-(7, 7) = II_1 * I_2 * I_3 * I_4 * I_5 * I_6 * I_7 \qquad (32\text{-}3)$$

$$EXO12a-(9, 7) = II_1 * I_2 * I_3 * I_4 * I_5 * I_6 * I_7 * I_8 * I_9 \qquad (32\text{-}4)$$

$$EXO12a-(11, 7) = II_1 * I_2 * I_3 * I_4 * I_5 * I_6 * I_7 * I_8 * I_9 * I_{10} * I_{11} \qquad (32\text{-}5)$$

$$EXO12a-(13, 7) = \qquad (32\text{-}6) \\ II_1 * I_2 * I_3 * I_4 * I_5 * I_6 * I_7 * I_8 * I_9 * I_{10} * I_{11} * I_{12} * I_{13}$$

$$EXO12a-(15, 7) = \qquad (32\text{-}7) \\ II_1 * I_2 * I_3 * I_4 * I_5 * I_6 * I_7 * I_8 * I_9 * I_{10} * I_{11} * I_{12} * I_{13} * I_{14} * I_{15}$$

Equations (32-1) to (32-7) are hereinafter also referred to as Equations (32).

Equations (22), (24), (26), (27), (28), (30), and (32) are obtained by EXOR calculating all the parallel inputs $I_1$ to $I_{16}$ that are positioned before in time series in the parallel inputs $I_1$ to $I_{16}$. These Equations (22), (24), (26), (27), (28), (30) and (32) satisfy Equation (1). In other words, the n-bit parallel precoder circuit according to the fifth embodiment is equivalent to the serial precoder circuit.

As explained above, according to the fifth embodiment, the EXOR circuit in the zeroth column executes the EXOR calculation by using the output of the delay circuit in the nth row as one input, and using the parallel input in the first row as the other input. The EXOR circuit in the (2k)th row and the first column executes the EXOR calculation by using the parallel input in the (2k)th row as one input, and using the output of the EXOR circuit in the zeroth column as the other input when the value of k is 1, or using the parallel signal in the (2k−1)th row as the other input when the value of k is larger than 1. The EXOR circuit in the (2^m)×kth row and the mth column executes the EXOR calculation by using as inputs the output of the EXOR circuit in the (2^m)×k−2^(m−1)th row and the (m−1)th column, and the output of the EXOR circuit in the (2^m)×k−2^(m−1))th row and the (m−1)-column, when (2^m)×k−2^(m−1) is equal to or larger than 1 and also when (2^m)×k is equal to or smaller than n. When the value of m is equal to or larger than hh and equal to or smaller than 2×hh−1, the EXOR circuit in the 2^hh−(2kk−1)×2^(2hh−m−1)th row and the mth column executes the EXOR calculation by using as inputs the output of the EXOR circuit having a largest column number among EXOR circuits disposed in the 2^hh −(2kk−1)×2^(2hh−m−1)th row (1≦kk, where kk is an integer), and the output of the EXOR circuit having a largest column number among EXOR circuits disposed in the 2^hh−2kk×2^(2hh−m−1)th row. The delay circuits in the first to the nth rows delay the output of the EXOR circuit having a largest column number among EXOR circuits disposed in the first to the nth rows respectively, and use the delayed results as the parallel outputs in the first to the nth rows.

In other words, the parallel precoder circuit according to the fifth embodiment executes the EXOR calculation by dividing data into plural groups, and obtains a result by further executing EXOR calculation at divided stages. Therefore, a parallel precoder having a small circuit delay can be obtained. Specifically, in the fifth embodiment, a maximum delay can be decreased to $2 \times \log_2 n - 1$ stages. Furthermore, a circuit scale can be decreased to within $n \times \log_2 n$.

A parallel precoder circuit according to a sixth embodiment of the present invention is explained below with reference to FIG. 13. In the above first to the fifth embodiments, delay circuits are disposed before the parallel outputs that the parallel precoder circuit calculates. The parallel precoder circuit according to the sixth embodiment continuously deletes the oldest data in time series during a serial transmission, in the delay circuits other than the nth row delay circuit that is carrying out a feedback from the parallel output to the pre-stage EXOR circuit.

Figure 13:
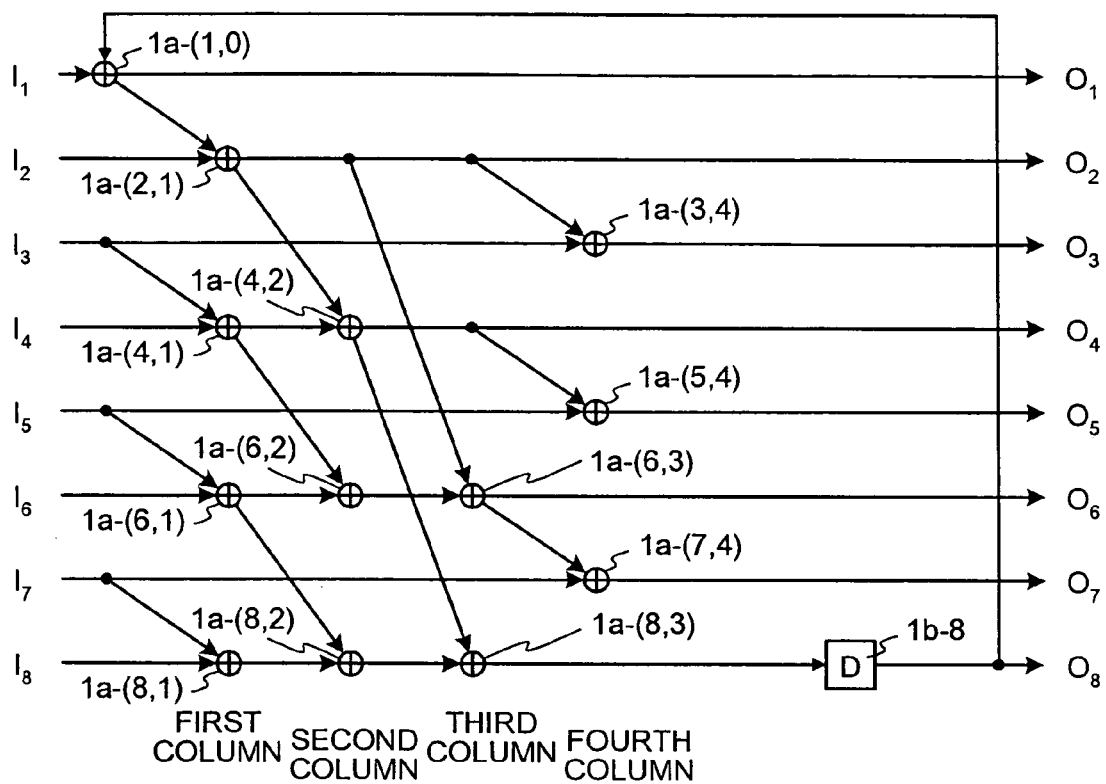
FIG. 13 is a schematic for illustrating an example of a configuration of a parallel precoder circuit according to a sixth embodiment of the present invention.

FIG. 13 is a schematic for illustrating an example of a configuration of a parallel precoder circuit according to the sixth embodiment. In the parallel precoder circuit shown in FIG. 13, the 7-bit continuous delay circuits 1b-1 to 1b-7, starting from the delay circuit 1b-1 that outputs the oldest data in time series during a serial transmission connected to the parallel output $O_1$, are deleted from the parallel precoder circuit according to the first embodiment shown in FIG. 1. Constituent elements having the same functions as those of the precoder circuit according to the first embodiment shown in FIG. 1 are designated with like reference numerals, and a redundant explanation is omitted.

In the parallel precoder circuits according to the first to the fifth embodiments, data that are output from the feedback-applied delay circuits are the latest data in the parallel output, that is, the data transmitted last in the serial transmission after the multiplexing. An output from other delay circuit corresponds to the n–1 bits before the data. The operation clock within the n-bit parallel precoder circuit is n/F (hertz). When the delay circuits are excluded, data at the pre-stage of one-clock delay circuit becomes new data by n bits.

When the delay circuits 1b-1 to 1b-7 shown in FIG. 1 are excluded, the parallel outputs $O_1$ to $O_7$ become 7-bit data that follow the data output from the delay circuit 1b-8 during the serial transmission. Therefore, in the multiplexing circuits disposed at the post-stage of the parallel precoder circuit, the parallel data $O_8$ from the delay circuit 1b-8 of the parallel precoder circuit is transmitted first during the serial transmission. Next, the parallel output $O_1$, the parallel output $O_2, \ldots$, and the parallel output $O_7$ are transmitted sequentially. Based on the above arrangement, data is transmitted faster only by n–1 clocks in one-clock unit time at the transmission speed F (hertz), as compared with when the parallel precoder circuit shown in FIG. 1 is used.

As explained above, in the parallel precoder circuit according to the sixth embodiment, the EXOR circuit in the zeroth column executes the EXOR calculation by using the output of the delay circuit in the nth row as one input, and using the parallel input in the first row as the other input. The EXOR circuit in the (2k)th row and the first column executes the EXOR calculation by using the parallel input in the (2k)th row as one input, and using the output of the EXOR circuit in the zeroth column as the other input when the value of k is 1, or using the parallel signal in the (2k–1)th row as the other input when the value of k is larger than 1. The EXOR circuit in the (2k)th row and the mth column executes the EXOR calculation by using the output of the EXOR circuit in the (2k)th row and the (m–1)th column as one input when $2k-2^{(m-1)}$ is equal to or larger than 1, and using the output of the EXOR circuit in the $(2k-2^{(m-1)})$th row and the (m–1)-column as the other input when an EXOR circuit is disposed in the $(2k-2^{(m-1)})$th row and the (m–1)th column. When no EXOR circuit is disposed in the $(2k-2^{(m-1)})$th row and the (m–1)th column, the EXOR circuit in the (2k)th row and the mth column executes the EXOR calculation by using the output of the EXOR circuit having a largest column number among EXOR circuits disposed in the $(2k-2^{(m-1)})$th row as the other input. The EXOR circuit in the (2k–1)th row and the hth column executes the EXOR calculation by using a parallel signal in the (2k–1)th row as one input, and using the output of the EXOR circuit having a largest column number among EXOR circuits disposed in the (2k–2)th row as the other input. The delay circuit in the nth row delays the output of the EXOR circuit having a largest column number among EXOR circuits disposed in the nth row. The delay circuit in the nth row produces the output of the EXOR circuit having a largest column number among EXOR circuits disposed in the first to the (n–1)th rows respectively as the parallel output in the first to the (n–1)th rows respectively, and produces the output of the nth row delay circuit as the nth row parallel output.

In other words, the parallel precoder circuit according to the sixth embodiment executes the EXOR calculation by dividing data into plural groups, and obtains a result by further executing EXOR calculation at divided stages. At the same time, the parallel precoder circuit delays only the parallel output in the nth row that is feedbacked to the EXOR circuit in the first row and the zeroth column. Therefore, a parallel precoder having a small circuit delay and a small circuit scale can be obtained.

Specifically, the n–1 delay circuits are decreased from the precoder circuit according to the first embodiment. A large circuit scale can be decreased when the number of bits of parallel input and out increases.

According to the sixth embodiment, an example of decreasing the delay circuits 1b-1 to 1b-7 from the parallel precoder circuit in the first embodiment is explained. It is needless to mention that a similar effect is also obtained by decreasing the delay circuits disposed in the first to the (n–1)th bits from the precoder circuits in the second to the fifth embodiments. While in the sixth embodiment, the delay circuit is disposed in only the nth bit, a similar effect can be also obtained by disposing delay circuits of continuous bits at the ith ($1 \leq i \leq n-1$) to nth bit.

A parallel precoder circuit according to a seventh embodiment of the present invention is explained below with reference to FIGS. 14 and 15. According to the first to the sixth embodiments, the parallel precoder circuit feedbacks the output of the delay circuit that holds the latest data among parallel outputs one clock before, and executes the EXOR calculation using the feedback data and the oldest parallel input among the parallel inputs. The parallel precoder circuit according to the seventh embodiment forms a feedback loop by executing the EXOR calculation using all parallel inputs and the outputs of the delay circuits.

Figure 14:
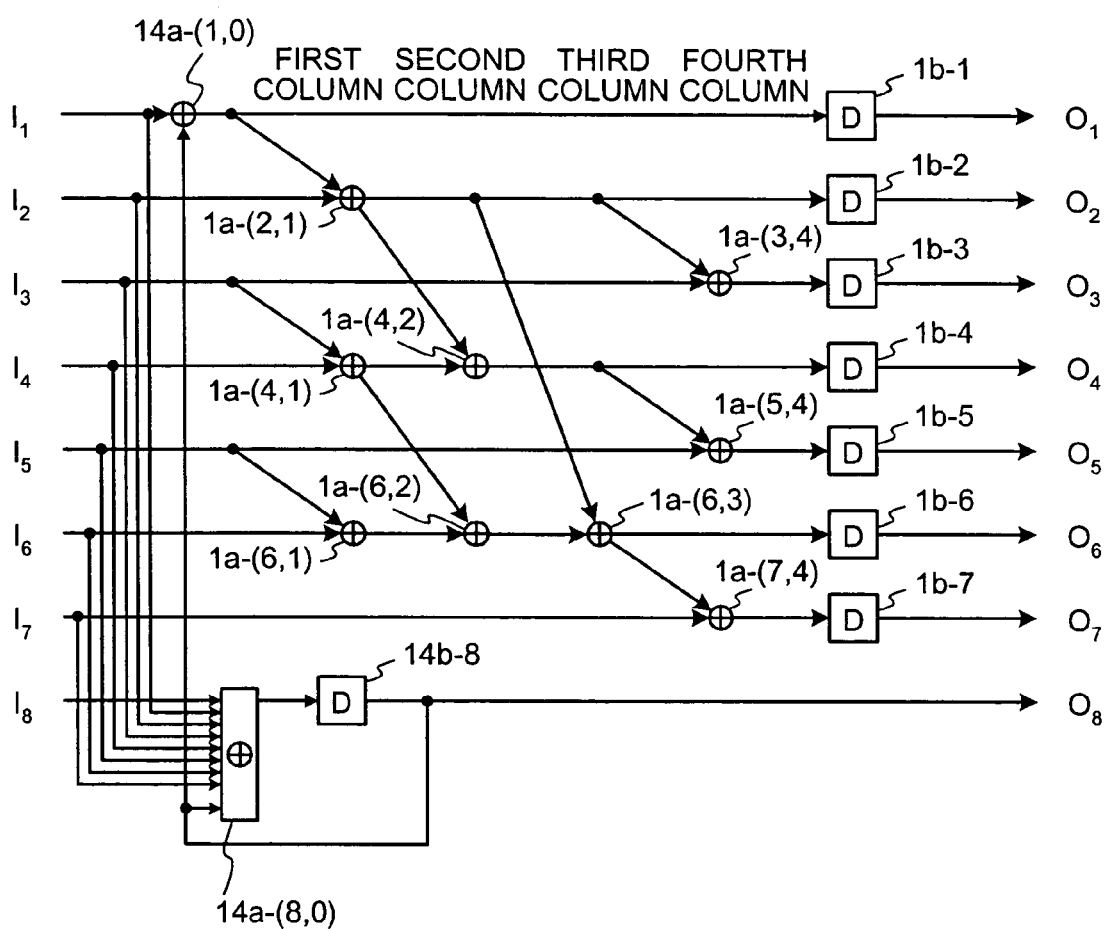
FIG. 14 is a schematic for illustrating an example of a configuration of a parallel precoder circuit according to a seventh embodiment of the present invention.

FIG. 14 is a schematic for illustrating an example of a configuration of a parallel precoder circuit according to the seventh embodiment, where "the number of bits n=8". The parallel precoder circuit shown in FIG. 14 includes (n+1)-input EXOR circuits 14a-(8, 0) and a delay circuit 14b-8, instead of the EXOR circuits 1a-(8, 1), 1a-(8, 2), and 1a-(8, 3) and the delay circuit 1b-8 of the parallel precoder circuit shown in (FIG. 1. In other words, the parallel precoder circuit according to the seventh embodiment is different from the parallel precoder circuit according to the first embodiment in only the EXOR circuit disposed at the eighth bit (eighth row). Constituent elements having the same functions as those of the precoder circuit according to the first embodiment shown in FIG. 1 are designated with like reference numerals, and a redundant explanation is omitted.

The EXOR circuits in the first row to the (n−1)th row and the delay circuits are connected to each other in a similar manner to that according to the first embodiment. The parallel inputs $I_1$ to $I_8$ and the outputs of the delay circuit 14b-8 are connected to the n+1 input EXOR circuit in the nth row, that is, the input of the nine input EXOR circuit 14a-(8, 0) in FIG. 14. The output of the delay circuit 14b-8 is the parallel output $O_8$. The output of the EXOR circuit 14a-(8, 0) is connected to the input of the delay circuit 14b-8. The parallel input $I_1$ is connected to one input of the EXOR circuit 14a-(1, 0) in the first row and the zeroth column, and the output of the delay circuit 14b-8 is connected to the other input of the EXOR circuit 14a-(1, 0).

The output of (n+1)-input EXOR circuits becomes "1" when an odd number of "1" are input, and becomes "0" when an even number of "1" are input, as described above. FIG. 15 depicts one example of a configuration of the EXOR circuit 14a-(8, 0) and the delay circuit 14b-8 shown in FIG. 14. The multiple-input (nine, in this case) EXOR circuit 14a-(8, 0) executes the EXOR calculation of the parallel inputs $I_1$ to $I_8$ by combining two-input EXOR circuits, as shown in FIG. 15.

Figure 15:
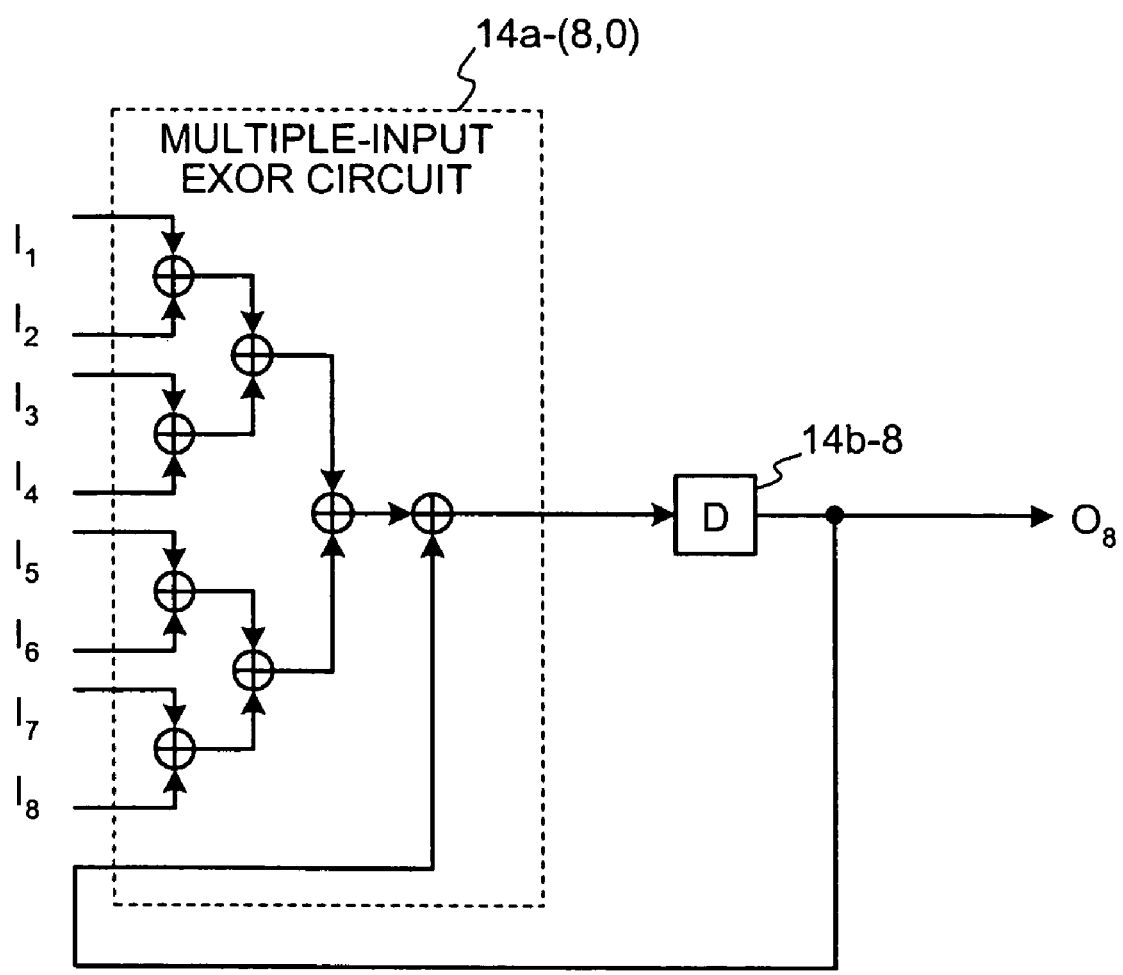
FIG. 15 is a schematic for illustrating a configuration of a multiple-input EXOR circuit and a delay circuit shown in FIG. 14.

The n+1 (nine, in this case) EXOR circuit 14a-(8, 0) shown in FIG. 15 EXOR calculates the output obtained by inputting the parallel inputs $I_1$ to $I_8$ to the two-input EXOR circuit structured in a tree shape, and the output of the delay circuit 14b-8. In this case, the parallel output $O_8$ satisfies the parallel output $O_n(T)$ shown in Equation (1).

The parallel precoder circuits according to the first to the sixth embodiments execute the EXOR calculation by dividing data into plural groups, and obtain a result by further executing EXOR calculation at divided stages. All the EXOR circuits use the outputs of the EXOR circuits that are in rows of later row numbers than the rows in which the own EXOR circuits are disposed. The output of the delay circuit in the nth row is feedbacked, and is input to the EXOR circuit in the first row and the zeroth column. However, the output of the EXOR circuit disposed in the nth row is not directly used to generate other parallel outputs $O_1$ to $O_{n-1}$. Therefore, when the parallel output $O_n$ is generated as described above, the parallel outputs $O_1$ to $O_{n-1}$ can satisfy the parallel outputs $O_1(T)$ to $O_{n-1}(T)$ in the logical expressions of the parallel precoder circuit shown in Equation (1) by using the same configurations as those in the first to the seventh embodiments.

As explained above, according to the seventh embodiment, the parallel precoder circuit includes (n+1)-input EXOR circuits that execute the EXOR calculation of all parallel inputs at the nth bit and the nth bit parallel output. The output of this EXOR circuit is delayed by one clock, and this delayed output is connected to the first-bit EXOR circuit. Therefore, a parallel precoder circuit having a small circuit delay can be obtained.

A feedback path in which data is output from the nth bit delay circuit and the same data is input again to the delay circuit is separated, thereby decreasing the number of EXOR circuits on the feedback path. With this arrangement, the required operation speed of the EXOR circuits can be decreased.

A parallel precoder circuit according to an eighth embodiment of the present invention is explained below with reference to FIG. 16. According to the seventh embodiment, a feedback path is separated using multiple-input EXOR circuits, thereby decreasing the required operation speed of the EXOR circuits. According to the eighth embodiment, the required operation speed of the EXOR circuits is decreased using a pipeline method.

Pipeline delay circuits (for example, flip-flops) are inserted into the parallel precoder circuit according to the seventh embodiment shown in FIG. 14 as follows. Flip-flops of the same number of stages as that of the flip-flops inserted in the net configuration part of the EXOR circuits are inserted into the post-stage of the delay circuit 14b-8. At the same time, the flip-flops of the same number as that of the flip-flops inserted in the nine-input EXOR circuit 14a-(8, 0) are inserted into the path after the parallel inputs $I_1$ to $I_{n-1}$ are branched to the input of the nine-input EXOR circuit 14a-(8, 0), and are connected to the post-stage of the remaining parallel inputs $I_1$ to $I_{n-1}$.

Figure 16:
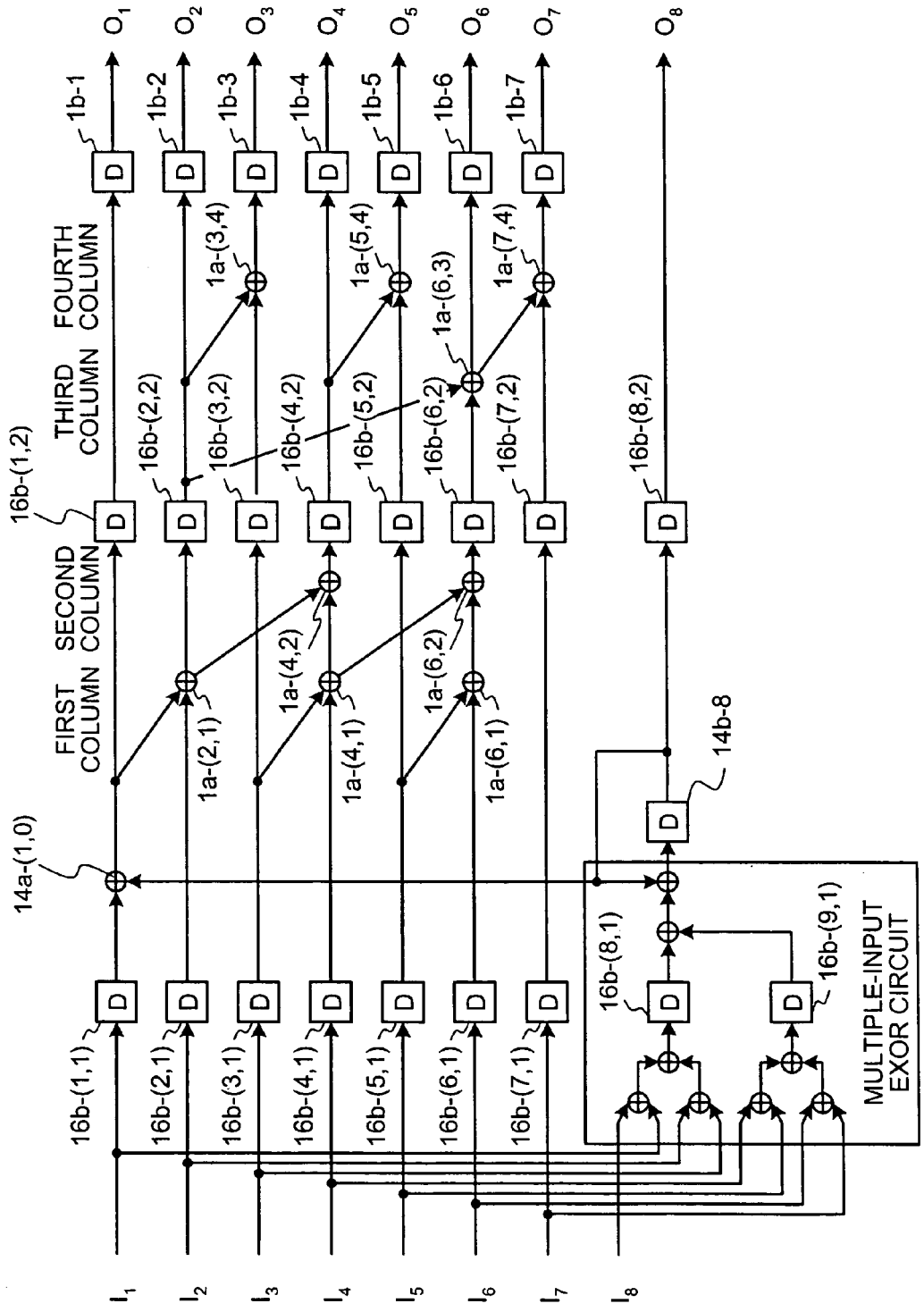
FIG. 16 is a schematic for illustrating an example of a configuration of a parallel precoder circuit according to an eighth embodiment of the present invention.

FIG. 16 is a schematic for illustrating an example of a configuration of a parallel precoder circuit according to the eighth embodiment, where the number of bits n=8. The parallel precoder circuit shown in FIG. 16 has the following pipeline delay circuits 16b (D in FIG. 16) added to the parallel precoder circuit according to the seventh embodiment shown in FIG. 14 (16b-(1, 1), 16b-(2, 1), 16b-(3, 1), 16b-(4, 1), 16b-(5, 1), 16b-(6, 1), 16b-(7, 1), 16b-(1, 2), 16b-(2, 2), 16b-(3, 2), 16b-(4, 2), 16b-(5, 2), 16b-(6, 2), 16b-(7, 2), and 16b-(8, 2)). Furthermore, the parallel precoder circuit shown in FIG. 16 has a nine-input EXOR circuit 16a-(8, 0), in place of the multiple-input (nine, in this case) EXOR circuit 14a-(8, 0).

The first-stage pipeline delay circuits (D in FIG. 16) 16b-(8, 1) and 16b-(9, 1) consisting of flip-flops or the like are inserted into between a second-stage EXOR circuit and a third-stage EXOR circuit from the parallel input $I_1$ to $I_8$ side, within the nine-input EXOR circuit 16a-(8, 0). After the parallel inputs $I_1$ to $I_7$ are branched to the input of the EXOR circuit 16a-(8, 0), the first-stage delay circuits 16b-(1, 1), 16b-(2, 1), 16b-(3, 1), 16b-(4, 1), 16b-(5, 1), 16b-(6, 1), and 16b-(7, 1) are inserted.

The first-stage pipeline delay circuits 16b-(1, 2), 16b-(2, 2), 16b-(3, 2), 16b-(4, 2), 16b-(5, 2), 16b-(6, 2), and 16b-(7, 2) are inserted into between the first to the (n−1)th bits, that is, between the second column and the third column in the first to the seventh rows. At the same time, the delay circuit 16b-(8, 2) is inserted into the post-stage of the eighth bit, or of the eighth-row delay circuit 14b-8.

With the above arrangement, delay circuits of an equal number of stages are inserted into all signal paths. Therefore, delays added to the parallel outputs $O_1$ to $O_n$ respectively within the parallel precoder circuit become equal. A maximum delay path can be separated without changing a mutual relationship between the parallel outputs $O_1$ to $O_n$. In FIG. 16, EXOR circuits on the maximum delay path can be decreased from four stages to two stages, by inserting the pipeline delay circuits. In this way, the number of stages of the EXOR circuits that should operate in one clock can be decreased. Consequently, the required operation speed of the EXOR circuits can be decreased.

As explained above, according to the eighth embodiment, pipeline delay circuits are inserted at each number of stages of the EXOR circuits that are directly connected so as to be able to operate at the operation speed F/n (hertz) of the circuits. Therefore, the maximum delay path of the EXOR circuits at the net configuration part can be decreased from n stages to $\log_2 n$ stages. The number of flip-flops that are inserted into the pipeline also becomes $(\log_2 n)/n$, thereby making the circuit scale small.

While the optical duobinary system is explained according to the first to the eighth embodiments, the present invention is not limited to this system. For example, the present invention can be also applied to a precoder based on a partial response (1, 1) system, and to a differential encoder based on the DPSK system.

According to the present invention, the EXOR circuit in the zeroth column executes the EXOR calculation by using the output of the delay circuit in the nth row as one input, and using the parallel input in the first row as the other input. The EXOR circuit in the (2k)th row ($1 \leq k \leq n/2$) and the first column executes the EXOR calculation by using the parallel input in the kth row as one input, and using the output of the EXOR circuit in the zeroth column as the other input when the value of k is 1, or using the parallel signal in the (2k−1)th/row as the other input when the value of k is larger than 1. The EXOR circuit in the (2k)th row and the mth column ($2 \leq m \leq h-1$, where m is an integer, and h is a smallest integer equal to or larger than $\log_2 n+1$) executes the EXOR calculation by using the output of the EXOR circuit in the (2k)th row and the (m−1)th column as one input when $2k-2^{(m-1)}$ is equal to or larger than 1, and using the output of the EXOR circuit in the (2k−2^(m−1))th row and the (m−1)-column as the other input when an EXOR circuit is disposed in the (2k−2^(m−1))th row and the (m−1)th column. When no EXOR circuit is disposed in the (2k−2^(m−1))th row and the (m−1)th column, the EXOR circuit in the (2k)th row and the mth column executes the EXOR calculation by using the output of the EXOR circuit having a largest column number among EXOR circuits disposed in the (2k−2^(m−1))th row as the other input. The EXOR circuit in the (2k−1)th row and the hth column executes the EXOR calculation by using a parallel signal in the (2k−1)th row as one input, and using the output of the EXOR circuit having a largest column number among EXOR circuits disposed in the (2k−2)th row as the other input. The delay circuit in the nth row delays the output of the EXOR circuit having a largest column number among EXOR circuits disposed in the nth row. The delay circuit in the nth row produces the output of the EXOR circuit having a largest column number among EXOR circuits disposed in the first to the (n−1)th rows respectively as the parallel output in the first to the (n−1)th rows respectively, and produces the output of the nth row delay circuit as the nth row parallel output.

In other words, the parallel precoder circuit executes the EXOR calculation by dividing data into plural groups, and obtains a result by further executing EXOR calculation at divided stages. Therefore, a parallel precoder circuit capable of decreasing the required operation speed of the EXOR circuits while decreasing the circuit scale can be obtained.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A parallel precoder circuit that executes an exclusive-OR operation on an n-row parallel input, and outputs an n-row parallel output, where n is an integer equal to or larger than two, the parallel precoder circuit comprising:
   an nth-row delay circuit that delays an output of an exclusive-OR circuit having a largest column number from among exclusive-OR circuits disposed in nth row;
   a zeroth-column exclusive-OR circuit that executes the exclusive-OR operation of an output of the nth-row delay circuit and a first-row parallel input;
   a (2k)th-row first-column exclusive-OR circuit that executes the exclusive-OR operation of a (2k)th-row parallel input and an output of the zeroth-column exclusive-OR circuit when k is one or a (2k−1)th-row parallel signal when k is larger than one, where k is an integer equal to or larger than one and equal to or smaller than n/2;
   a (2k)th-row mth-column exclusive-OR circuit that executes the exclusive-OR operation of an output of a (2k)th-row (m−1)th-column exclusive-OR circuit, when $2k-2^{(m-1)}$ is equal to or larger than one, and an output of a (2k−2^(m−1))th-row (m−1)th-column exclusive-OR circuit when an exclusive-OR circuit is disposed in (2k−2^(m−1))th-row (m−1)th-column or an output of an exclusive-OR circuit having a largest column number from among exclusive-OR circuits disposed in (2k−2^(m−1))th row when no exclusive-OR circuit is disposed in (2k−2^(m−1))th-row (m−1)th-column, where m is an integer equal to or larger than two and equal to or smaller than h−1, and h is a smallest integer equal to or larger than $\log_2 n+1$; and
   a (2k−1)th-row hth-column exclusive-OR circuit that executes the exclusive-OR operation of a (2k−1)th-row parallel signal and an output of an exclusive-OR circuit having a largest column number from among exclusive-OR circuits disposed in (2k−2)th row, wherein
   outputs of exclusive-OR circuits each of which having a largest column number from among exclusive-OR circuits disposed in first to (n−1)th rows become first-row to (n−1)th-row parallel outputs, respectively, and
   the output of the nth-row delay circuit becomes an nth-row parallel output.

2. The parallel precoder circuit according to claim 1, further comprising:
   ith-row to (n−1)th-row delay circuits that delay outputs of exclusive-OR circuits each of which having a largest column number from among exclusive-OR circuits disposed in ith to (n−1)th rows, where i is an integer equal to or larger than one and equal to or smaller than n−1, wherein
   outputs of the ith-row to (n−1)th-row delay circuits become ith-row to (n−1)th-row parallel outputs.

3. The parallel precoder circuit according to claim 1, further comprising:
   a multiple-input exclusive-OR circuit that executes the exclusive-OR calculation of first-row to nth-row parallel inputs and the output of the nth-row delay circuit, and outputs a result of the exclusive-OR calculation to the nth-row delay circuit and one input of the zeroth-column exclusive-OR circuit, wherein
   the zeroth-column exclusive-OR circuit executes the exclusive-OR operation using an output of the multiple-input exclusive-OR circuit instead of the output of the nth-row delay circuit.

4. The parallel precoder circuit according to claim 3, wherein
   when the multiple-input exclusive-OR circuit includes a delay circuit that delays an output of a local circuit by a predetermined number of stages, the parallel precoder circuit further includes a delay circuit that delays first-row to (n−1)th-row parallel input signals by a delay amount equal to a delay of the predetermined number of stages.

5. The parallel precoder circuit according to claim 1, further comprising:
   a first delay circuit that is disposed between first-row to (n−1)th-row jth-column exclusive-OR circuits from among exclusive-OR circuits disposed in first to (n−1)th rows and exclusive-OR circuits disposed after first-row to (n−1)th-row (j+1)th-column, to delay a signal by an optional number of stages, where j is an integer equal to or larger than one and equal to or smaller than h; and
   a second delay circuit that is disposed at a post-stage of the nth row delay circuit to delay a signal by a delay amount equal to the delay of the optional number of stages.

6. A parallel precoder circuit that executes an exclusive-OR operation on an n-row parallel input, and outputs an n-row parallel output, where n is an integer equal to or larger than two, the parallel precoder circuit comprising:
an nth-row delay circuit that delays an output of an exclusive-OR circuit having a largest column number from among exclusive-OR circuits disposed in nth row;
a zeroth-column exclusive-OR circuit that executes the exclusive-OR operation of an output of the nth-row delay circuit and a first-row parallel input;
an (r×k)th-row first-column exclusive-OR circuit that executes the exclusive-OR operation of an output of the zeroth-column exclusive-OR circuit and parallel inputs from second row to rth row when k is 1, and executes the exclusive-OR operation of parallel input from (r×k−r+1)th row to (r×k)th row when k is larger than 1, where r is a maximum number of inputs to a plurality of multiple-input exclusive-OR circuits, r is an integer equal to or larger than two, and k is an integer equal to or larger than one and equal to or smaller than n/r;
an (r×k)th-row mth-column multiple-input exclusive-OR circuit that executes the exclusive-OR operation with an output of an (r×k−p×r^(m−1))th-row (m−1)th-column multiple-input exclusive-OR circuit from (r×k−(r−1)×r^(m−1))th row to (r×k)th row as an input when r×k−p×r^(m−1) is equal to or larger than one, and executes the exclusive-OR operation with an output of a multiple-input exclusive-OR circuit having a largest column number from among multiple-input exclusive-OR circuits disposed in (r×k−p×r^(m−1))th row as the input when no multiple-input exclusive-OR circuit is disposed in (r×k−p×r^(m−1))th row (m−1)th column, where m is an integer equal to or larger than 2 and equal to or smaller than h−1, h is a smallest integer equal to or larger than $\log_r n+1$, and p is an integer equal to or larger than zero and equal to or smaller than r−1; and
an (r×k−q)th-row hth-column multiple-input exclusive-OR circuit that executes the exclusive-OR operation of a parallel input from (r×k−1)th row to (r×k−q)th row and an output of a multiple-input exclusive-OR circuit having a largest column number from among multiple-input exclusive-OR circuits disposed in (r×k−r)th row, where q is an integer equal to or larger than one and equal to or smaller than r−1, wherein
outputs of exclusive-OR circuits each of which having a largest column number from among exclusive-OR circuits disposed in first to (n−1)th rows become first-row to (n−1)th-row parallel outputs, respectively, and
the output of the nth-row delay circuit becomes an nth-row parallel output.

7. The parallel precoder circuit according to claim 6, further comprising:
ith-row to (n−1)th-row delay circuits that delay outputs of exclusive-OR circuits each of which having a largest column number from among exclusive-OR circuits disposed in ith to (n−1)th rows, where i is an integer equal to or larger than one and equal to or smaller than n−1, wherein
outputs of the ith-row to (n−1)th-row delay circuits become ith-row to (n−1)th-row parallel outputs.

8. The parallel precoder circuit according to claim 6, further comprising:
a multiple-input exclusive-OR circuit that executes the exclusive-OR calculation of first-row to nth-row parallel inputs and the output of the nth-row delay circuit, and outputs a result of the exclusive-OR calculation to the nth-row delay circuit and one input of the zeroth-column exclusive-OR circuit, wherein
the zeroth-column exclusive-OR circuit executes the exclusive-OR operation using an output of the multiple-input exclusive-OR circuit instead of the output of the nth-row delay circuit.

9. The parallel precoder circuit according to claim 8, wherein
when the multiple-input exclusive-OR circuit includes a delay circuit that delays an output of a local circuit by a predetermined number of stages, the parallel precoder circuit further includes a delay circuit that delays first-row to (n−1)th-row parallel input signals by a delay amount equal to a delay of the predetermined number of stages.

10. The parallel precoder circuit according to claim 6, further comprising:
a first delay circuit that is disposed between first-row to (n−1)th-row jth-column exclusive-OR circuits from among exclusive-OR circuits disposed in first to (n−1)th rows and exclusive-OR circuits disposed after first-row to (n−1)th-row (j+1)th-column, to delay a signal by an optional number of stages, where j is an integer equal to or larger than one and equal to or smaller than h; and
a second delay circuit that is disposed at a post-stage of the nth row delay circuit to delay a signal by a delay amount equal to the delay of the optional number of stages.

11. A parallel precoder circuit that executes an exclusive-OR operation on an n-row parallel input, and outputs an n-row parallel output, where n is an integer equal to or larger than two, the parallel precoder circuit comprising:
an nth-row delay circuit that delays an output of an exclusive-OR circuit having a largest column number from among exclusive-OR circuits disposed in nth row;
a zeroth-column exclusive-OR circuit that executes the exclusive-OR operation of an output of the nth-row delay circuit and a first-row parallel input;
a kth-row first-column exclusive-OR circuit that executes the exclusive-OR operation of a kth-row parallel input and an output of the zeroth-column exclusive-OR circuit when k is two or a (k−1)th-row parallel input when k is larger than two, where k is an integer equal to or larger than two and equal to or smaller than n; and
a kth-row mth-column exclusive-OR circuit that executes the exclusive-OR operation of an output of a kth-row (m−1)th-column exclusive-OR circuit and an output of a (k−2^(m−1))th-row (m−1)th-column, when k−2^(m−1) is equal to or larger than one, and executes the exclusive-OR operation of the output of the kth-row (m−1)th-column exclusive-OR circuit and an output of an exclusive-OR circuit having a largest column number from among exclusive-OR circuits disposed in (k−2^(m−1))th row when no exclusive-OR circuit is disposes in (k−2^(m−1))th-row (m−1)th-column, where m is an integer equal to or larger than two and equal to or smaller than h, and h is a smallest integer equal to or larger than $\log_2 n$, wherein
outputs of exclusive-OR circuits each of which having a largest column number from among exclusive-OR circuits disposed in first to (n−1)th rows become first-row to (n−1)th-row parallel outputs, respectively, and
the output of the nth-row delay circuit becomes an nth-row parallel output.

12. The parallel precoder circuit according to claim 11, further comprising:
ith-row to (n−1)th-row delay circuits that delay outputs of exclusive-OR circuits each of which having a largest column number from among exclusive-OR circuits disposed in ith to (n−1)th rows, where i is an integer equal to or larger than one and equal to or smaller than n−1, wherein outputs of the ith-row to (n−1)th-row delay circuits become ith-row to (n−1)th-row parallel outputs.

13. The parallel precoder circuit according to claim 11, further comprising:

a multiple-input exclusive-OR circuit that executes the exclusive-OR calculation of first-row to nth-row parallel inputs and the output of the nth-row delay circuit, and outputs a result of the exclusive-OR calculation to the nth-row delay circuit and one input of the zeroth-column exclusive-OR circuit, wherein the zeroth-column exclusive-OR circuit executes the exclusive-OR operation using an output of the multiple-input exclusive-OR circuit instead of the output of the nth-row delay circuit.

14. The parallel precoder circuit according to claim 13, wherein when the multiple-input exclusive-OR circuit includes a delay circuit that delays an output of a local circuit by a predetermined number of stages, the parallel precoder circuit further includes a delay circuit that delays first-row to (n−1)th-row parallel input signals by a delay amount equal to a delay of the predetermined number of stages.

15. The parallel precoder circuit according to claim 11, further comprising:

a first delay circuit that is disposed between first-row to (n−1)th-row jth-column exclusive-OR circuits from among exclusive-OR circuits disposed in first to (n−1)th rows and exclusive-OR circuits disposed after first-row to (n−1)th-row (j+1)th-column, to delay a signal by an optional number of stages, where j is an integer equal to or larger than one and equal to or smaller than h; and a second delay circuit that is disposed at a post-stage of the nth row delay circuit to delay a signal by a delay amount equal to the delay of the optional number of stages.

16. A parallel precoder circuit that executes an exclusive-OR operation on an n-row parallel input, and outputs an n-row parallel output, where n is an integer equal to or larger than two, the parallel precoder circuit comprising:

an nth-row delay circuit that delays an output of an exclusive-OR circuit having a largest column number from among exclusive-OR circuits disposed in nth row;

a zeroth-column exclusive-OR circuit that executes the exclusive-OR operation of an output of the nth-row delay circuit and a first-row parallel input;

a kth-row first-column exclusive-OR circuit that executes the exclusive-OR operation of an output of the zeroth-column exclusive-OR circuit and a (k−q)th-row parallel input from second row to kth row when k−q is one, or a (k−q)th-row parallel input from (k−r+1)th row to the kth row when k−q is larger than one, where r is a maximum number of inputs to a plurality of multiple-input exclusive-OR circuits, r is an integer equal to or larger than two, k is an integer equal to or larger than two and equal to or smaller than n, and q is an integer equal to or larger than zero and equal to or smaller than r−1; and a kth-row mth-column multiple-input exclusive-OR circuit that executes the exclusive-OR operation with an output of a $(k-p \times r^{(m-1)})$th-row (m−1)th-column multiple-input exclusive-OR circuit from $(k-(r-1) \times r^{(m-1)})$th row to the kth row as an input when $k-p \times r^{(m-1)}$ is equal to or larger than one, and executes the exclusive-OR operation with an output of a multiple-input exclusive-OR circuit having a largest column number from among multiple-input exclusive-OR circuits disposed in $(k-p \times r^{(m-1)})$th row when no multiple-input exclusive-OR circuit is disposed in $(k-p \times r^{(m-1)})$th-row (m−1)th-column, where m is an integer equal to or larger than two and equal to or smaller than h, h is a smallest integer equal to or larger than $\log_2 n$, and p is an integer equal to or larger than zero and equal to or smaller than r−1, wherein outputs of exclusive-OR circuits each of which having a largest column number from among exclusive-OR circuits disposed in first to (n−1)th rows become first-row to (n−1)th-row parallel outputs, respectively, and the output of the nth-row delay circuit becomes an nth-row parallel output.

17. The parallel precoder circuit according to claim 16, further comprising:

ith-row to (n−1)th-row delay circuits that delay outputs of exclusive-OR circuits each of which having a largest column number from among exclusive-OR circuits disposed in ith to (n−1)th rows, where i is an integer equal to or larger than one and equal to or smaller than n−1, wherein outputs of the ith-row to (n−1)th-row delay circuits become ith-row to (n−1)th-row parallel outputs.

18. The parallel precoder circuit according to claim 16, further comprising:

a multiple-input exclusive-OR circuit that executes the exclusive-OR calculation of first-row to nth-row parallel inputs and the output of the nth-row delay circuit, and outputs a result of the exclusive-OR calculation to the nth-row delay circuit and one input of the zeroth-column exclusive-OR circuit, wherein the zeroth-column exclusive-OR circuit executes the exclusive-OR operation using an output of the multiple-input exclusive-OR circuit instead of the output of the nth-row delay circuit.

19. The parallel precoder circuit according to claim 18, wherein when the multiple-input exclusive-OR circuit includes a delay circuit that delays an output of a local circuit by a predetermined number of stages, the parallel precoder circuit further includes a delay circuit that delays first-row to (n−1)th-row parallel input signals by a delay amount equal to a delay of the predetermined number of stages.

20. The parallel precoder circuit according to claim 16, further comprising:

a first delay circuit that is disposed between first-row to (n−1)th-row jth-column exclusive-OR circuits from among exclusive-OR circuits disposed in first to (n−1)th rows and exclusive-OR circuits disposed after first-row to (n−1)th-row (j+1)th-column, to delay a signal by an optional number of stages, where j is an integer equal to or larger than one and equal to or smaller than h; and a second delay circuit that is disposed at a post-stage of the nth row delay circuit to delay a signal by a delay amount equal to the delay of the optional number of stages.

21. A parallel precoder circuit that executes an exclusive-OR operation on an n-row parallel input, and outputs an n-row parallel output, where n is an integer equal to or larger than two, the parallel precoder circuit comprising:

an nth-row delay circuit that delays an output of an exclusive-OR circuit having a largest column number from among exclusive-OR circuits disposed in nth row;

a zeroth-column exclusive-OR circuit that executes the exclusive-OR operation of an output of the nth-row delay circuit and a first-row parallel input;

a (2k)th-row first-column exclusive-OR circuit that executes the exclusive-OR operation of a (2k)th-row parallel input and an output of the zeroth-column exclusive-OR circuit when k is one or a (2k−1)th-row parallel input when k is larger than one, where k is an integer equal to or larger than one and equal to or smaller than n/2;

a $((2^m) \times k)$th-row mth-column exclusive-OR circuit that executes the exclusive-OR operation of an output of a $((2^m) \times k)$th-row (m−1)th-column exclusive-OR circuit and an output of a $((2^m) \times k - 2^{(m-1)})$th-row (m−1)th-column exclusive-OR circuit when $(2^m) \times k - 2^{(m-1)}$ is equal to or larger than one and when $(2^m) \times k$ is equal to or smaller than n, where m is an integer equal to or larger than two and equal to or smaller than hh, and hh is a smallest integer equal to or larger than $\log_2 n$ satisfying h=2×hh−1, where h indicates a last column where an exclusive-OR circuit is disposed; and a $((2^{hh} - (2kk-1) \times 2^{(2hh-m-1)}))$th-row mth-column exclusive-OR circuit that executes the exclusive-OR operation of an output of an exclusive-OR circuit having a largest column number from among exclusive-OR circuits disposed in $((2^{hh} - (2kk-1) \times 2^{(2hh-m-1)}))$th row and an output of an exclusive-OR circuit having a largest column number from among exclusive-OR circuits disposed in $((2^{hh} - 2kk \times 2^{(2hh-m-1)}))$th row when m is equal to or larger than hh and equal to or smaller than 2×hh−1, where kk is an integer equal to or larger than one, wherein outputs of exclusive-OR circuits each of which having a largest column number from among exclusive-OR circuits disposed in first to (n−1)th rows become first-row to (n−1)th-row parallel outputs, respectively, and the output of the nth-row delay circuit becomes an nth-row parallel output.

22. The parallel precoder circuit according to claim 21, further comprising:

ith-row to (n−1)th-row delay circuits that delay outputs of exclusive-OR circuits each of which having a largest column number from among exclusive-OR circuits disposed in ith to (n−1)th rows, where i is an integer equal to or larger than one and equal to or smaller than n−1, wherein outputs of the ith-row to (n−1)th-row delay circuits become ith-row to (n−1)th-row parallel outputs.

23. The parallel precoder circuit according to claim 21, further comprising:

a multiple-input exclusive-OR circuit that executes the exclusive-OR calculation of first-row to nth-row parallel inputs and the output of the nth-row delay circuit, and outputs a result of the exclusive-OR calculation to the nth-row delay circuit and one input of the zeroth-column exclusive-OR circuit, wherein the zeroth-column exclusive-OR circuit executes the exclusive-OR operation using an output of the multiple-input exclusive-OR circuit instead of the output of the nth-row delay circuit.

24. The parallel precoder circuit according to claim 23, wherein when the multiple-input exclusive-OR circuit includes a delay circuit that delays an output of a local circuit by a predetermined number of stages, the parallel precoder circuit further includes a delay circuit that delays first-row to (n−1)th-row parallel input signals by a delay amount equal to a delay of the predetermined number of stages.

25. The parallel precoder circuit according to claim 21, further comprising:

a first delay circuit that is disposed between first-row to (n−1)th-row jth-column exclusive-OR circuits from among exclusive-OR circuits disposed in first to (n−1)th rows and exclusive-OR circuits disposed after first-row to (n−1)th-row (j+1)th-column, to delay a signal by an optional number of stages, where j is an integer equal to or larger than one and equal to or smaller than h; and a second delay circuit that is disposed at a post-stage of the nth row delay circuit to delay a signal by a delay amount equal to the delay of the optional number of stages.

* * * * *